United States Patent [19]

Creedon et al.

[11] Patent Number: 5,235,432
[45] Date of Patent: Aug. 10, 1993

[54] VIDEO-TO-FACSIMILE SIGNAL CONVERTER

[76] Inventors: Brendan G. Creedon, 805 Pomona Ave., Albany, Calif. 94706; Lou Katz, 3317 Brunell Dr., Oakland, Calif. 94602

[21] Appl. No.: 796,634

[22] Filed: Nov. 22, 1991

[51] Int. Cl.$^5$ .............................................. H04N 1/04
[52] U.S. Cl. .................................. 358/479; 358/433; 358/442; 358/445; 358/455; 358/456; 358/457; 358/468
[58] Field of Search ............... 358/400, 401, 405, 406, 358/426, 201.1, 261.2, 261.3, 261.4, 429, 430, 431, 432, 433, 434, 435, 436, 442, 443, 445, 455, 456, 457, 458, 465, 468, 471, 476, 479, 141, 142, 160; 382/54, 55

[56] References Cited
U.S. PATENT DOCUMENTS

| | | | |
|---|---|---|---|
| 4,514,767 | 4/1985 | Kubota et al. | 382/54 |
| 4,720,849 | 1/1988 | Tayama | 358/401 |
| 4,802,008 | 1/1989 | Walling | 358/406 |
| 4,979,028 | 12/1990 | Minematsu et al. | 358/261.4 |
| 5,067,019 | 11/1991 | Juday et al. | 358/160 |

Primary Examiner—Edward L. Coles, Sr.
Assistant Examiner—Jerome Grant, II

[57] ABSTRACT

A video-to-facsimile signal converter includes means for receiving and converting a video signal representing a continuous tone video image to a facsimile signal for transmission to and reception by a facsimile receiver for simulation of the continuous tone video image. An analog-to-digital converter receives and converts an analog video signal to digital video data which is captured by a video data two-field buffer. A digital signal processor, in conjunction with a memory look-up table, processes the captured video data by: interpolating the video data from the video resolution up to a higher facsimile resolution; selectively enhancing the image by sharpening image edges; precompensating the interpolated video data by altering its contrast transfer function; and dithering the interpolated and precompensated video data to produce video pel data blocks which correspond to the original video pixel data blocks and have similar composite gray-scale values. A facsimile encoder then encodes the interpolated, precompensated and dithered video data in accordance with the CCITT Group 3 facsimile standard. A MODEM and data access arrangement couple the facsimile-encoded signal onto a telephone line for transmission to and reception by a facsimile receiver for simulating the original continuous tone video image.

26 Claims, 9 Drawing Sheets

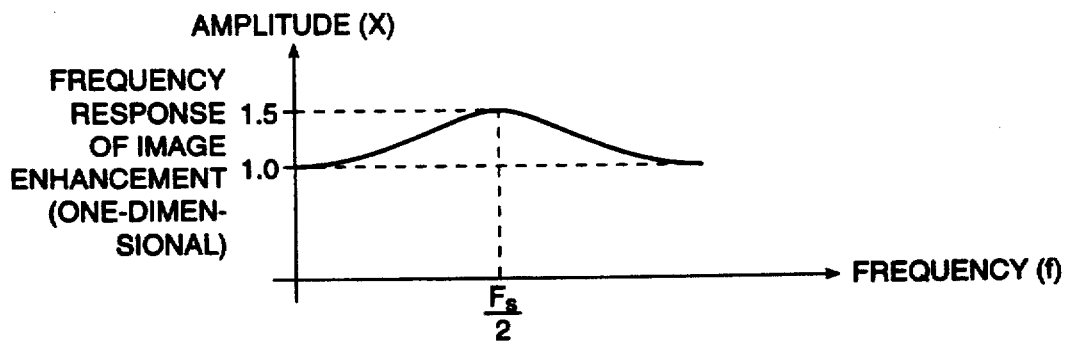
FIG. 4a
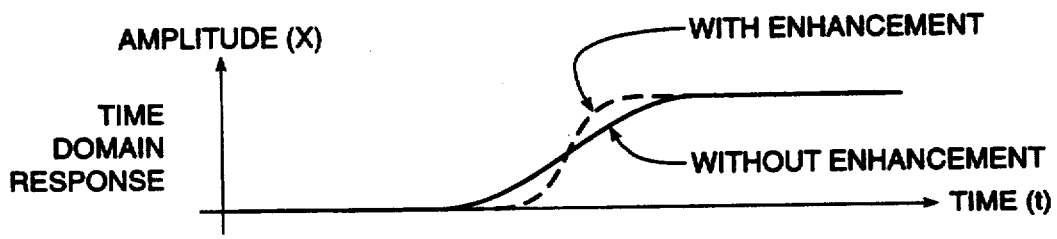
FIG. 4b
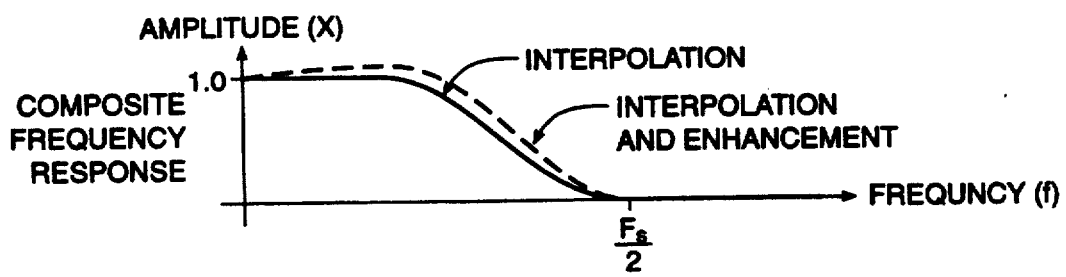
FIG. 4c
FIG. 4d

VIDEO-TO-FACSIMILE SIGNAL CONVERTER

BACKGROUND OF THE INVENTION

1. Field of the Invention

The present invention relates to video signal processors, and in particular, video signal processors for receiving and converting a video signal having multiple bits per pixel and representing a continuous tone video image to a facsimile signal having a single bit per pixel for transmission to and reception by a facsimile machine for producing a hard copy representation of the continuous tone video image.

2. Description of the Related Art

As the sophistication and capabilities of video system components such as video cameras and tape recorders have increased and their costs have decreased, uses for such components to capture and retain visual images in the form of video signals have increased in both number and form. Two uses in particular have become substantially more widespread. One use involves the capture and retention of visual images for use at a later time. Video signal recorders, such as video tape recorders, video cassette recorders or video disks, have served quite well for such uses. Another use involves the capture and transmission of video images for use at a distant, e.g. remote, location. This type of use has generally required some means of signal transmission to convey the video signal representing the visual image to the remote location. Such means of signal transmission typically include the use of some form of hard-wired video signal transmission medium, such as co-axial cable, or a radio frequency ("RF") transceiver. The former if often unwieldy or impractical, particularly over long distances, while the latter is often expensive and subject to restricted and heavily regulated RF spectrum allocations.

Other means for conveying video signals which has been used with some success are telephone networks. By converting the subject video signal to a digital video signal consisting of video pixel data and coupling it onto a telephone line via a modulator-demodulator ("MODEM"), the video information can be transmitted, albeit slowly, to many possible locations. At the receiving end, the video pixel data can be retrieved with another MODEM and processed as needed for viewing on a video monitor or storage on video tape. Alternatively, the video pixel data, if transmitted in accordance with an appropriate data standard, can be received by a facsimile machine and "reproduced" in the form of a hard copy printout.

However, such "reproduction" by a facsimile machine is not accurate. A video signal representing a continuous tone video image, when digitized, contains video pixel data (e.g. eight bits) representing the gray-scale values, or contrast range, of the continuous tone video image. However, a facsimile machine is capable of reproducing pel data (i.e. single bit) only, which may be thought of as a single bit per pixel. Accordingly, some form of "thresholding" is often performed to convert the video pixel data to video pel data for use by the facsimile machine. However, this generally results in a reproduced video image having a flat or grainy appearance. One technique which has been used with varying success to avoid this flat image appearance is "dithering." In "dithering," for each selected group of original pixels a group of corresponding pels is produced, which as a group, has a composite gray-scale value similar to that of the original group of pixels.

Accordingly, it would be desirable to have a video-to-facsimile signal converter for receiving and converting a video signal representing a continuous tone video image to a facsimile signal suitable for transmission to and reception by a commercial facsimile machine for more accurately "reproducing" the continuous tone video image by way of a hard copy printout.

SUMMARY OF THE INVENTION

A video-to-facsimile signal converter in accordance with the present invention receives and converts a video signal representing a continuous tone video image to a facsimile signal suitable for transmission to and reception by a facsimile receiver for simulating the continuous tone video image. The present invention includes means for selective data interpolation, image processing, signal contrast alteration, pixel-to-pel data signal conversion and encoding, as well as means for providing appropriate control signals for each of these operations.

The data interpolator, in accordance with a conversion control signal, receives and interpolates a pixel data signal representing the continuous tone video image by converting the size of the video image to a size appropriate for a facsimile printout. The image processor means selectively processes the pixel data signal to provide the desired image (e.g. sharpened, negative, contour-mapped) for printing out on a facsimile machine. The signal contrast alternation means, in accordance with a conversion control signal, receives and selectively alters the interpolated pixel data signal to selectively alter its contrast transfer function. The pixel-to-pel data signal converter, in accordance with a conversion control signal, receives and converts the interpolated and selectively altered pixel data signal to a pel data signal. The pel data signal has a composite gray-scale value when viewed over a block of pels which closely approximates the composite gray-scale value over the corresponding block of pixels. The encoder, in accordance with a conversion control signal, encodes the pel data signal according to a selected facsimile encoding standard to produce a facsimile standard signal. A preferred embodiment of the present invention uses a digital signal processor as the means for selective data interpolation, image processing, signal constrast alteration, pixel-to-pel data signal conversion and encoding, with a memory as the means for providing appropriate control signals for each of these operations.

These and other features and advantages of the present invention will be understood upon consideration of the following detailed description of the invention and the accompanying drawings.

BRIEF DESCRIPTION OF THE DRAWINGS

FIG. 4A illustrates the frequency response of an exemplary image enhancement operation for the video-to-facsimile signal converter of FIG. 2A.

FIG. 4B illustrates the two-dimensional filter coefficients for an exemplary image enhancement operation for the video-to-facsimile signal converter of FIG. 2A.

FIG. 4C illustrates the relative time domain responses for the video-to-facsimile signal converter of FIG. 2A with and without an image enhancement operation.

FIG. 4D illustrates the composite frequency responses for the video-to-facsimile signal converter of FIG. 2A with an interpolation operation only, and with both interpolation and image enhancement operations.

DETAILED DESCRIPTION OF THE INVENTION

Figure 1:
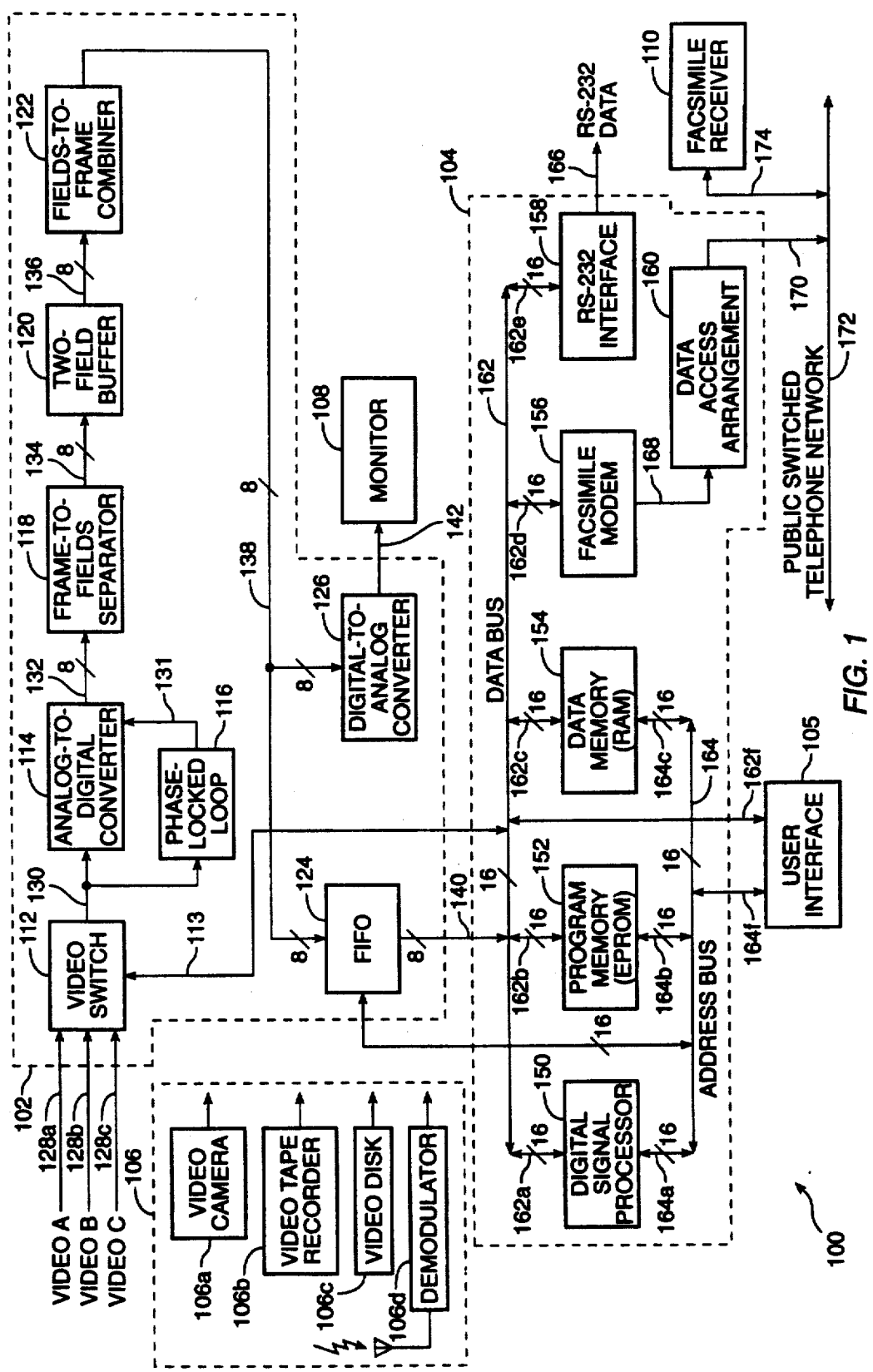
FIG. 1 is a functional block diagram of a video system using a video-to-facsimile signal converter in accordance with the present invention.

Referring to FIG. 1, a video system 100 using a video-to-facsimile signal converter in accordance with the present invention includes a video signal processing section 102, a video signal conversion section 104 and a user interface 105. As discussed further below, normal operation of the video system 100 will include use of a video source 106, a video monitor 108 and a facsimile receiver 110.

The video processor section 102 includes a: video switch 112; analog-to-digital converter ("ADC") 114; phase-locked loop ("PLL") 116; frame-to-fields separator 118; two-field buffer 120; fields-to-frame combiner 122; first-in, first-out memory ("FIFO") 124; and digital-to-analog converter ("DAC") 126. The video switch 112 receives a plurality of video input signals 128a, 128b, 128c, which can be video signals in accordance with a number of formats (e.g. NTSC or PAL in color or monochrome), and a switch control signal 113. Any of these video input signals 128a, 128b, 128c can come from virtually any type of video source 106. The video source 106 can be of many different types, such as a video camera 106a, video tape recorder 106b, video disk player 106c or a demodulator 106d which receives some form of over-the-air video broadcast signal. The switch control signal 113, received from the video signal conversion section 104 (discussed further below), determines which video input signal 128a, 128b, 128c is selected.

The selected video signal 130 from the video switch 112 is received by the ADC 114 and PLL 116. The PLL 116, based upon its input video signal 130, generates a synchronization signal 131 for the ADC 114. The ADC 114 samples (at a sampling frequency $F_S$ of approximately 9.7 MHz) and converts its input video signal 130 to a 8-bit wide digitized monochrome video signal 132. Each 8-bit word within this signal 132 represents a pixel, and therefore provides a 256-value gray-scale.

The digitized video signal 132 is received by the frame-to-fields separator 118. The frame-to-fields separator 118 allows the two fields which make up a video frame to be treated separately. Video data 134 representing both fields can be stored in the two-field buffer 120, and can provide a deinterlaced frame image. Alternatively, video data 134 representing one field (either odd or even) can be selected and used as the representation of the original video image. The buffered two-field video data 136 is received by the fields-to-frame combiner 122 for selective recombination. This allows for the display of either a correct, i.e. interlaced, two-field frame or a frame made up of two copies of one field (odd or even).

The video frame data 138 is received by the FIFO 124 and DAC 126. The FIFO 124 receives and stores several selected lines (as desired) from this video frame data 138 and provides corresponding, selectively delayed output video data 140 on a first-in, first-out basis. The DAC 126 converts the digital video frame data 138 to an analog video signal 142 for reception and display on a video monitor 108. This allows the user of the system 100 to view the video information which is being processed by the video processing section 102 and converted by the video converting section 104.

Although in the preferred embodiment described herein the digitized 132 and subsequently processed video signals 134, 136, 138 represent monochrome video information, it should be understood that the ADC 114 can alternatively be designed to sample and convert an analog color input video signal 130 to a digital color signal. For example, this digital color signal can include three 8-bit wide digitized video signals (in serial or parallel) which represent red, green and blue video information. Each group of three 8-bit words within such a color signal would represent the red, green and blue color components of a pixel. The color components could be those of any system used to represent color, such as RGB, YUV (PAL) or CYMK.

The video converter section 104 includes a: digital signal processor ("DSP") 150; program memory (e.g. EPROM) 152; data memory (e.g. RAM) 154; facsimile MODEM 156; RS-232 interface 158; and a data access arrangement ("DAA") 160. A data bus 162 is included for receiving the data 140 from the FIFO 124 (in the video processing section 102, as discussed above) and for transferring data among the DSP 150, program memory 152, data memory 154, facsimile MODEM 156 and RS-232 interface 158. An address bus 164 is included to allow the DSP 150 to address the FIFO 124, program memory 152 and data memory 154, as desired.

The data 140 from the FIFO 124, transferred via the data bus 162, is received by the DSP 150 for processing. As discussed further below, the DSP 150 processes this data in accordance with instructions received from the program memory 152 and data received from the data memory 154 via the data bus 162 and address bus 164. Once processed, the data is transferred via the data bus 162 to the facsimile MODEM 156 or RS-232 interface 158.

The RS-232 interface 158 encodes data received by it and provides an RS-232 data signal 166 for external use. The facsimile MODEM 156 converts (e.g. modulates)

data received by it for transmission over a telephone line. The facsimile MODEM 156 provides this converted signal 168 to the data access arrangement 160, which in turn provides an appropriately coupled facsimile signal 170 for transmission over a telephone network 172. As discussed further below, a facsimile receiver 110, when appropriately addressed, receives a signal 174 from the telephone network 172 containing the video information to be simulated in the form of hard copy printout.

Interfaces other than the data access arrangement 160 which can be used include an acoustic coupler (not shown) for use with a public telephone or cellular telephone, and a cellular telephone MODEM (not shown) for communicating directly via the cellular telephone network frequencies.

The user interface 105 can be composed as desired of various devices. In a preferred embodiment, a numeric keypad and liquid crystal display ("LCD") are used, respectively, for inputting data or instructions and displaying data or status information. Alternatively, other devices can be used as desired, such as an alphanumeric keypad and a CRT video display screen.

Figure 2A:
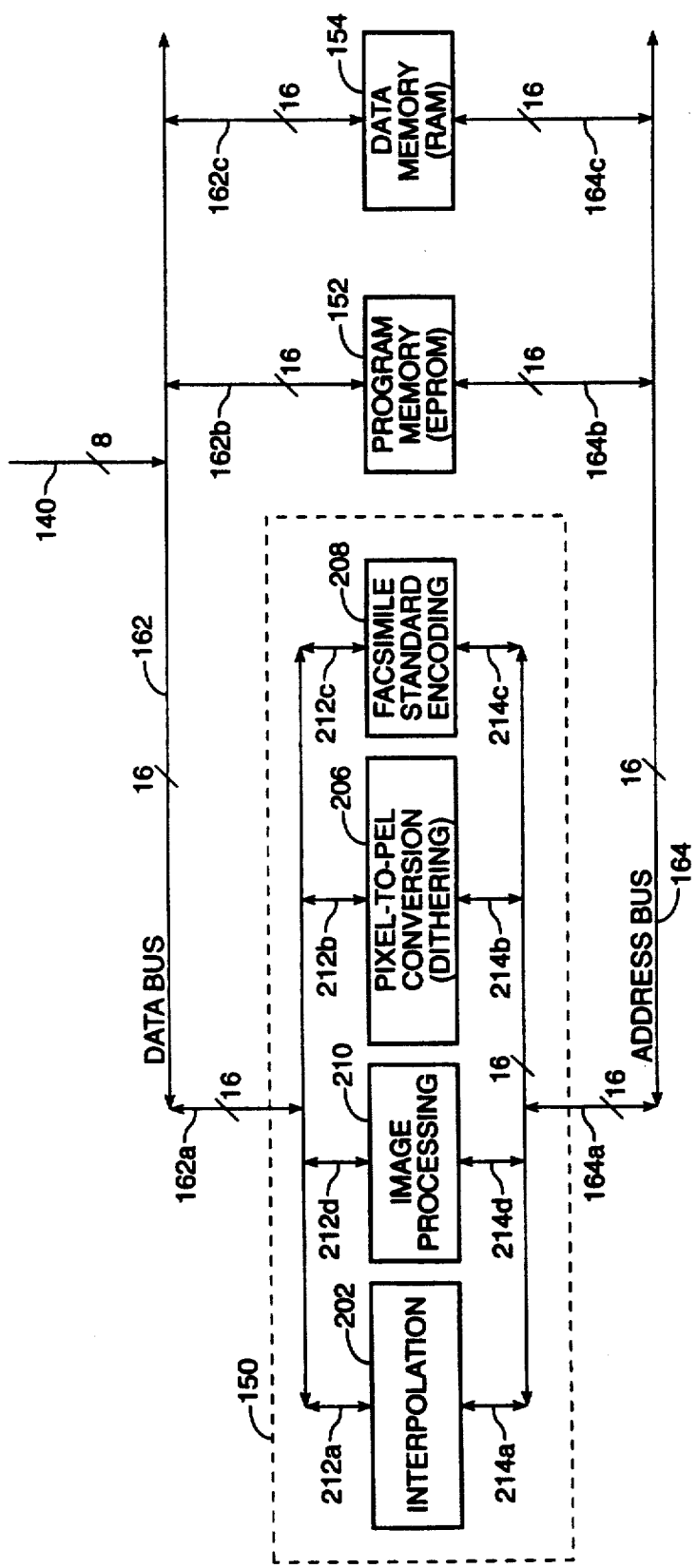
FIG. 2A is a functional block diagram of a video-to-facsimile signal converter in accordance with the present invention.

Referring to FIG. 2A, the DSP 150 provides means for interpolation 202, image processing 210, pixel-to-pel conversion 206 and facsimile standard encoding 208 of the video data 140 received from the FIFO 124. Internal data bus interfaces 212a, 212b, 212c, 212d and address bus interfaces 214a, 214b, 214c, 214d provide access to and from the external data bus interface 162a and address bus interface 164a, respectively. This access allows the DSP 150 to receive instructions from the program memory 152 and data from the data memory 154, as well as address the memories 152, 154. As discussed further below, in a preferred embodiment, the interpolator 202, image processor 210, pixel-to-pel converter 206 and facsimile standard encoder 208 represent operations of software modules which are executed by the DSP 150 (discussed further below).

The interpolator 202 receives the video data 140 via the data bus 162 and data bus interfaces 162a, 212a and interpolates it in accordance with instructions received from the program memory 152 via the data bus 162 and data bus interfaces 162b, 162a, 212a (discussed further below). The image processor 210 selectively receives the interpolated data via the data bus interfaces 212a, 212d and processes it in accordance with instructions received from the program memory 152 via the data bus 162 and data bus interfaces 162b, 162a, 212d (discussed further below). The interpolated and image-processed data is transferred, via the data bus 162 and data bus interfaces 212d, 162a, 162c, to the data memory 154 for alteration of its contrast range, i.e. dot gain correction (discussed further below).

In accordance with instructions and data received from the program memory 152 and data memory 154 via the data bus 162 and address bus 164, respectively, the interpolated, image-processed and contrast-altered data is then retrieved from the data memory 154 via the data bus 162 and data bus interfaces 162c, 162a, 212b, and processed by the pixel-to-pel converter 206 for conversion to pel data (discussed further below). The pel data, i.e. dithered data, is transferred to the data memory 154 for temporary storage prior to its encoding by the facsimile standard encoder 208.

In accordance with instructions and data received from the program memory 152 and data memory 154 via the data bus 162 and address bus 164, respectively, the pel data is then retrieved from the data memory 154 via the data bus 162 and data bus interfaces 162c, 162a, 212c, and encoded according to a facsimile standard. The facsimile standard-encoded pel data is then sent to the data bus 162 for transfer to the facsimile MODEM 156 or RS-232 interface 158.

In a preferred embodiment of the present invention, the facsimile standard encoding 208 is done in accordance with CCITT Group 3 (Recommendations T.4 and T.30). The time sequence of the facsimile standard-encoded pel data is as shown below in Chart 1.

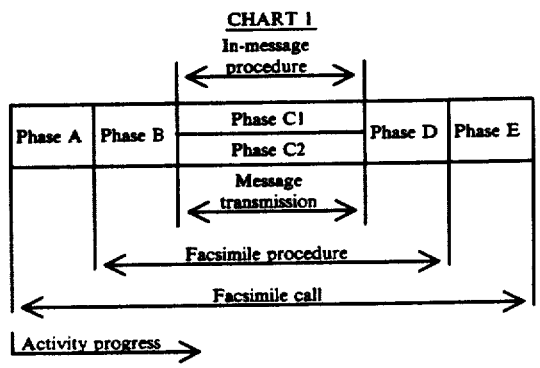

During phase B of the above-identified time sequence, the initiation of and handshaking for the facsimile message can be performed in accordance with the capabilities of the sending and receiving equipment as outlined in Recommendation T.30, part of which is shown below in Table 1.

TABLE 1

| | CCITT Group 3 Facsimile Standard | |
|---|---|---|
| Bit No. | From Receiver DIS/DTC | From Transmitter DCS |
| 1 | Transmitter - T.2 operation | |
| 2 | Receiver - T.2 operation | Receiver - T.2 operation |
| 3 | T.2 IOC = 176 | T.2 IOC = 176 |
| 4 | Transmitter - T.3 operation | |
| 5 | Receiver - T.3 operation | Receiver - T.3 operation |
| 6 | Reserved for future T.3 operation features | |
| 7 | Reserved for future T.3 operation features | |
| 8 | Reserved for future T.3 operation features | |
| 9 | Transmitter - T.4 operation | |
| 10 | Receiver - T.4 operation | Receiver - T.4 operation |
| 11, 12 | Data signalling rate | Data signalling rate |
| (0,0) | V.27 ter fallback mode | 2400 bit/s V.27 ter |
| (0,1) | V.27 ter | 4800 bit/s V.27 ter |
| (1,0) | V.29 | 9600 bit/s V.29 |
| (1,1) | V.27 ter and V.29 | 7200 bit/s V.29 |
| 13 | Reserved for new modulation system | |
| 14 | Reserved for new modulation system | |
| 15 | Vertical resolution = 7.7 line/mm | Vertical resolution = 7.7 line/mm (200 dpi) |
| 16 | Two dimensional coding capability | Two dimensional coding |
| 17, 18 | Recording width capabilities | Recording width |
| (0,0) | 1728 picture elements along scan line length of 215 mm ± 1% | 1728 picture elements along scan line length of 215 mm ± 1% |
| (0,1) | 1728 picture elements along scan line length of 215 mm ± | 2432 picture elements along |

TABLE 1-continued

CCITT Group 3 Facsimile Standard

| Bit No. | From Receiver DIS/DTC | From Transmitter DCS |
|---|---|---|
| | 1% 2048 picture elements along scan line length of 255 mm ± 1% | scan line length of 303 mm ± 1% |
| | 2432 picture elements along scan line length of 303 mm ± 1% | |
| (1,0) | 1728 picture elements along scan line length of 215 mm ± 1% and 2048 picture elements along scan line length of 255 mm ± 1% | 2048 picture elements along scan line 255 mm ± 1% |
| (1,1) | Invalid | Invalid |
| 19, 20 | Maximum recording length capability | Maximum recording length |
| (0,0) | A4 (297 mm) | A4 (297 mm) |
| (0,1) | Unlimited | Unlimited |
| (1,0) | A4 (297 mm) and B4 (364 mm) | B4 (364 mm) |
| (1,1) | Invalid | Invalid |
| 21, 22 | Minimum scan line time capability at the receiver | Minimum scan line time |
| 23 | | |
| (0,0,0) | 20 ms at 3.85 1/mm: $T_{7.7} = T_{3.85}$ | 20 ms |
| (0,0,1) | 40 ms at 3.85 1/mm: $T_{7.7} = T_{3.85}$ | 40 ms |
| (0,1,0) | 10 ms at 3.85 1/mm: $T_{7.7} = T_{3.85}$ | 10 ms |
| (1,0,0) | 5 ms at 3.85 1/mm: $T_{7.7} = T_{3.85}$ | 5 ms |
| (0,1,1) | 10 ms at 3.85 1/mm: $T_{7.7} = \frac{1}{2} T_{3.85}$ | |
| (1,1,0) | 20 ms at 3.85 1/mm: $T_{7.7} = \frac{1}{2} T_{3.85}$ | |
| (1,0,1) | 40 ms at 3.85 1/mm: $T_{7.7} = \frac{1}{2} T_{3.85}$ | |
| (1,1,1) | 0 ms at 3.85 1/mm: $T_{7.7} = T_{3.85}$ | 0 ms |
| 24 | Extend field | Extend field |
| 25 | 2400 bit/s handshaking | 2400 bit/s handshaking |
| 26 | Uncompressed mode | Uncompressed mode |
| 27 | Error correction mode | Error correction mode |
| 28 | Set to "0" | Frame size 0 = 256 octets 1 = 64 octets |
| 29 | Error limiting mode | Error limiting mode |
| 30 | Reserved for G4 capability on PSTN | Reserved for G4 capability on PSTN |
| 31 | Unassigned | |
| 32 | Extend field | Extend field |
| 33 | Validity of bits 17, 18 | Recording width |
| (0) | Bits 17, 18 are valid | Recording width indicated by bits 17, 18 |
| (1) | Bits 17, 18 are invalid | Recording width indicated by this field bit information |
| 34 | Recording width capability 1216 picture elements along scan line length of 151 mm ± 1% | Middle 1216 elements of 1728 picture elements |
| 35 | Recording width capability 864 picture elements along scan line length of 107 mm ± 1% | Middle 864 elements of 1728 picture elements |
| 36 | Recording width capability 1728 picture elements along scan line length of 151 mm ± 1% | Invalid |
| 37 | Recording width capability 1728 picture elements along scan line length of 107 mm ± 1% | Invalid |
| 38 | Reserved for future recording width capability | |
| 39 | Reserved for future recording width capability | |
| 40 | Extend field | Extend field |

Figure 2B:
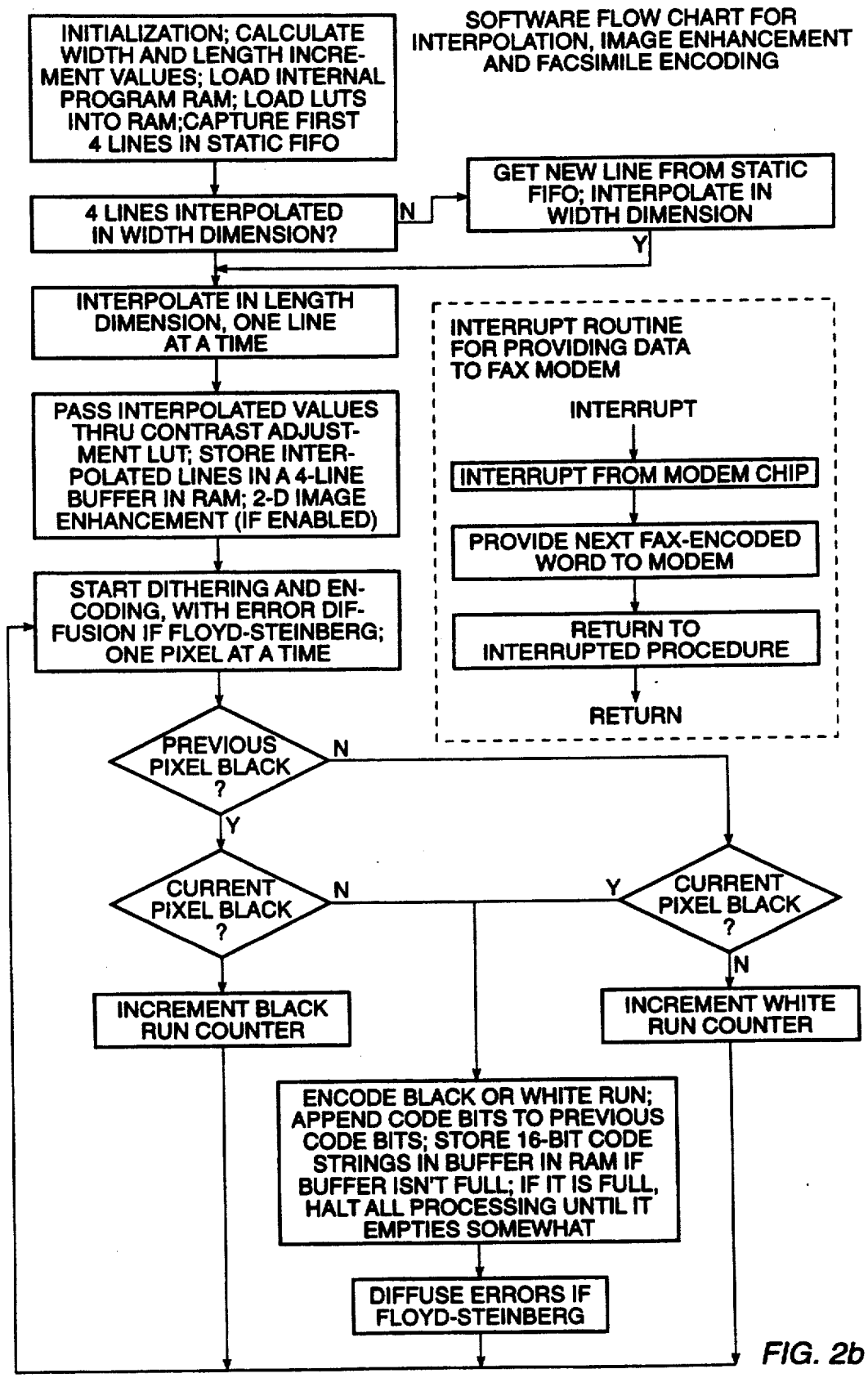
FIG. 2B is a flowchart representing the video-to-facsimile signal conversion performed by the video-to-facsimile signal converter of FIG. 2A.

Referring to FIG. 2B, a simplified software flowchart depicting these operations in accordance with the foregoing discussion is illustrated. This flowchart represents the sequence of operations performed by the DSP 150 in accordance with instructions stored within the program memory 152 (discussed further below).

The interpolation operation discussed above inserts new pixel data in between existing pixel data by interpolating adjacent pixel data, typically in a bilinear (two-dimensional linear) or bicubic (two-dimensional cubic) fashion. The two-dimensional interpolation (bilinear or bicubic) is performed in two one-dimensional passes, i.e. first horizontally (inter-pixel) and then vertically (inter-line). For example, in the case where 512 pixels on each line are to be expanded to 1728 pixels, the original 512 pixels are first interpolated horizontally to produce 1728 pixels with a concommittant reduction in the individual pixel spacing (i.e. to 511/1727), as depicted below in Chart 2.

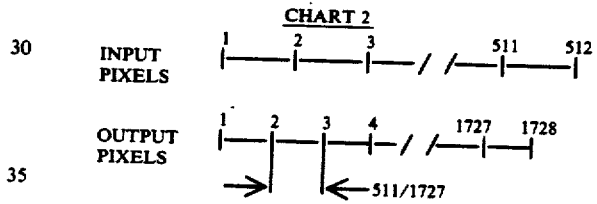

CHART 2

For bilinear interpolation of each interpolated pixel N, where $N \in \{0,1,2,\ldots,1727\}$, adjacent input pixels P and P+1 are used, where $P = INT[N(511)/1727]$, and $INT(X/Y)$ = integer value of the quotient X/Y. Thus, in the case of the 1000th pixel, i.e. N=1000, pixel 295 ($INT[1000(511)/1727]=295$) and pixel 296 ($INT[1000(511)/1727]+1=296$) are used. Since the quotient $[1000(511)/1727]=295.89$, the interpolation can be done within the DSP 150 via the simple computation:

$$N = (PIXEL\ \#295)(1-0.89) + (PIXEL\ \#296)(0.89)$$

Alternatively, a look-up table within the data memory 154 can be used, wherein a finite number of interpolation coefficients can be stored for use as needed. An exemplary table of bilinear interpolation coefficients for the present invention are listed below in Table 2. In the foregoing example for N=1000, entry #7 from Table 2 would be used, i.e. coefficients 0.109375 and 0.890625, selected as follows:

$$(P+1) - [N(511)/1727] = 296 - [1000(511)/1727]$$
$$= 296 - 295.89$$
$$= 0.11$$

$$0.11(\#\ of\ coefficient\ entries) = 0.11(64)$$
$$= 7.11$$

Nearest integer to 7.11 = 7 where:

N=(PIXEL #295)(0.109375)+(PIXEL #296)(0.890625)

TABLE 2

| BILINEAR INTERPOLATION COEFFICIENTS | | | | | |
|---|---|---|---|---|---|
| Entry | $L_A$ | $L_B$ | Entry | $L_A$ | $L_B$ |
| 0 | 0.0 | 1.0 | 32 | 0.5 | 0.5 |
| 1 | 0.015625 | 0.984375 |  | 0.515625 | 0.484375 |
| 2 | 0.03125 | 0.96875 |  | 0.53125 | 0.46875 |
| 3 | 0.046875 | 0.953125 | 35 | 0.546875 | 0.453125 |
| 4 | 0.0625 | 0.9375 |  | 0.5625 | 0.4375 |
| 5 | 0.078125 | 0.921875 |  | 0.578125 | 0.421875 |
| 6 | 0.09375 | 0.90625 |  | 0.59375 | 0.40625 |
| 7 | 0.109375 | 0.890625 |  | 0.609375 | 0.390625 |
| 8 | 0.125 | 0.875 | 40 | 0.625 | 0.375 |
| 9 | 0.140625 | 0.859375 |  | 0.640625 | 0.359375 |
| 10 | 0.15625 | 0.84375 |  | 0.65625 | 0.34375 |
|  | 0.171875 | 0.828125 |  | 0.671875 | 0.328125 |
|  | 0.1875 | 0.8125 |  | 0.6875 | 0.3125 |
|  | 0.203125 | 0.796875 | 45 | 0.703125 | 0.296875 |
|  | 0.21875 | 0.78125 |  | 0.71875 | 0.28125 |
| 15 | 0.234375 | 0.765625 |  | 0.734375 | 0.265625 |
|  | 0.25 | 0.75 |  | 0.75 | 0.25 |
|  | 0.265625 | 0.734375 |  | 0.765625 | 0.234375 |
|  | 0.28125 | 0.71875 | 50 | 0.78125 | 0.21875 |
|  | 0.296875 | 0.703125 |  | 0.796875 | 0.203125 |
| 20 | 0.3125 | 0.6875 |  | 0.8125 | 0.01875 |
|  | 0.328125 | 0.671875 |  | 0.828125 | 0.171875 |
|  | 0.34375 | 0.65625 |  | 0.84375 | 0.15625 |
|  | 0.359375 | 0.640625 | 55 | 0.859375 | 0.140625 |
|  | 0.375 | 0.625 |  | 0.875 | 0.125 |
| 25 | 0.390625 | 0.609375 |  | 0.890625 | 0.109375 |
|  | 0.40625 | 0.59375 |  | 0.90625 | 0.09375 |
|  | 0.421875 | 0.578125 |  | 0.921875 | 0.078125 |
|  | 0.4375 | 0.5625 | 60 | 0.9375 | 0.0625 |
|  | 0.453125 | 0.546875 |  | 0.953125 | 0.046875 |
| 30 | 0.46875 | 0.53125 |  | 0.96875 | 0.03125 |
| 31 | 0.484375 | 0.515625 | 63 | 0.984375 | 0.015625 |

Figure 3A:
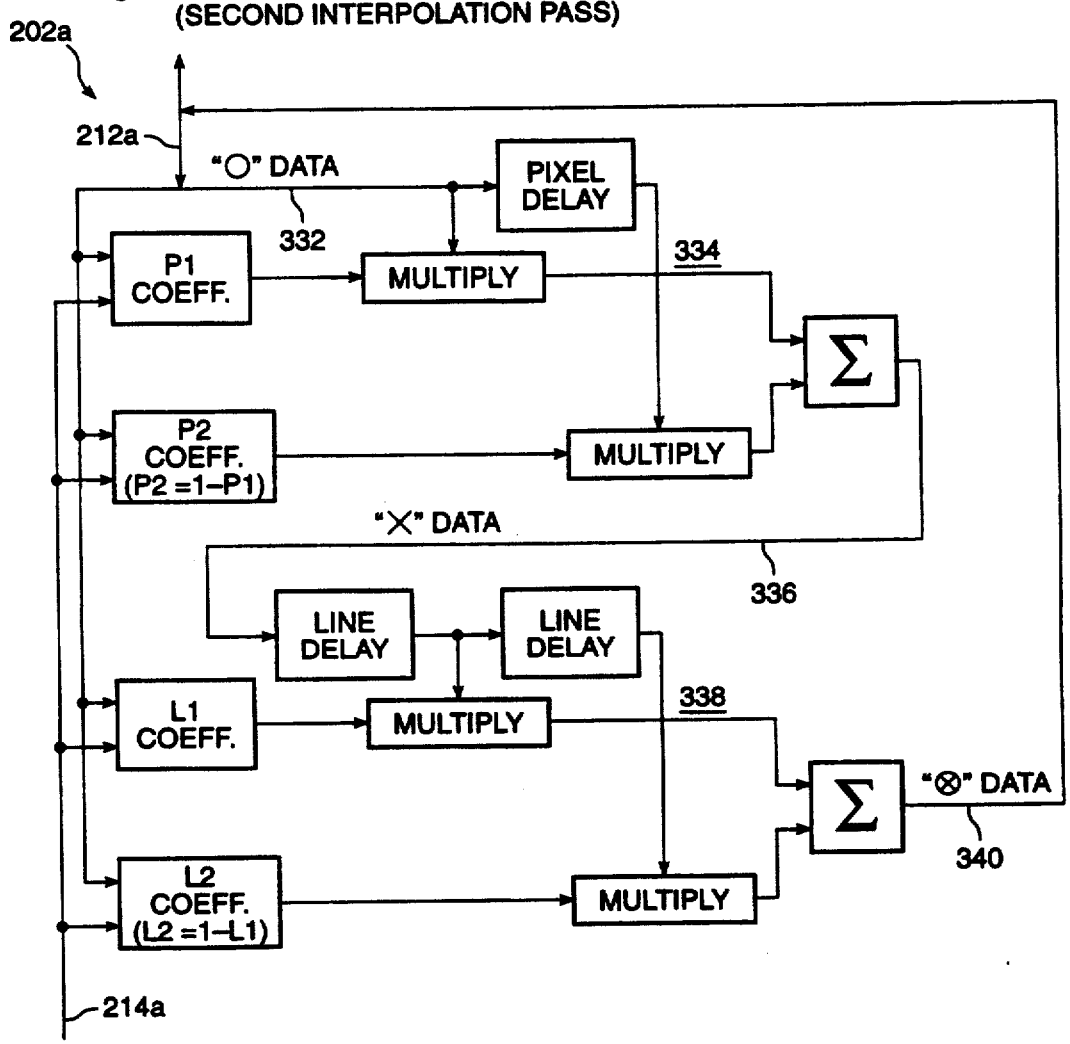
FIG. 3A is a functional block diagram of an exemplary bilinear interpolation operation for the video-to-facsimile signal converter of FIG. 2A.

Referring to FIG. 3A, the operation of an exemplary bilinear interpolator 202a is depicted. Incoming, non-interpolated pixel data 332, received via the data bus interface 212a, is horizontally interpolated by a horizontal linear interpolator 334. The horizontally interpolated pixel data 336 is received and vertically interpolated by a vertical linear interpolator 338. The horizontally and vertically interpolated pixel data 340 is then available for transfer to the data memory 154 for temporary storage, as discussed above. The pixel coefficients P1, P2, L1, L2 (discussed above) are selectively provided in accordance with instructions and addressing received via the data bus interface 212a and address interface 214a from the program memory 152 and data memory 154.

Figure 3B:
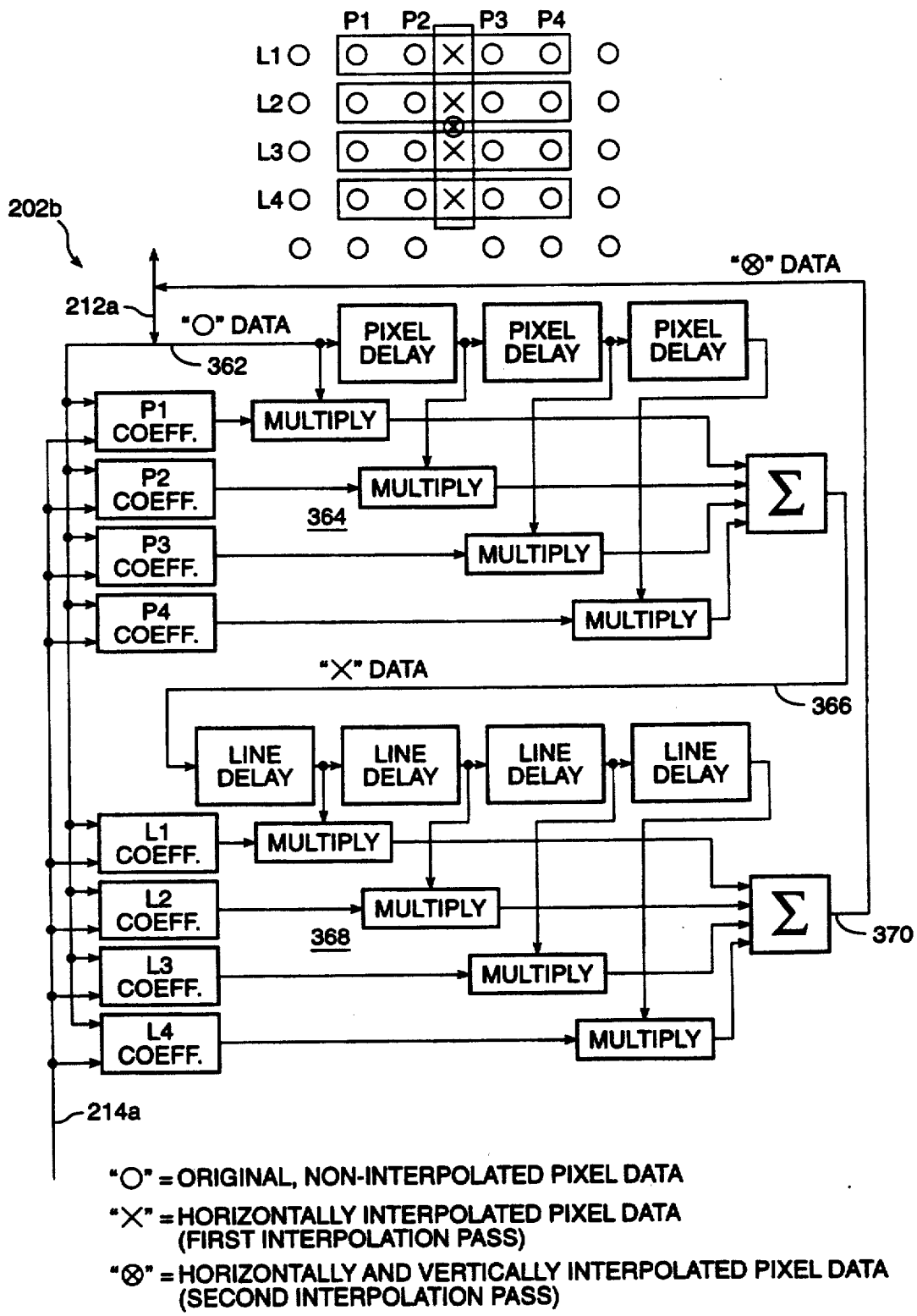
FIG. 3B is a functional block diagram of an exemplary bicubic interpolation operation for the video-to-facsimile signal converter of FIG. 2A.

Referring to FIG. 3B, the operation of an exemplary bicubic interpolator 202b is depicted. Incoming, non-interpolated pixel data 362, received via the data bus interface 212a, is horizontally interpolated by a horizontal cubic interpolator 364. The horizontally interpolated pixel data 366 is received and vertically interpolated by a vertical cubic interpolator 368. The horizontally and vertically interpolated pixel data 370 is then available for transfer to the data memory 154 for temporary storage, as discussed above. The pixel coefficients P1, P2, P3, P4, L1, L2, L3, L4 (discussed further below) are selectively provided in accordance with instructions and addressing received via the data bus interface 212a and address interface 214a from the program memory 152 and data memory 154.

It should be understood that the time delays represented by the "pixel delay" blocks in FIGS. 3A and 3B are not required as discrete elements or operations if the original, non-interpolated pixel data is retrieved from the data memory 154 at the appropriate times. Further, the time delays represented by the "line delay" blocks are not required as discrete elements or operations if the horizontally interpolated pixel data is temporarily stored in and retrieved from the data memory 154 at the appropriate times.

Using the example discussed above for bilinear horizontal interpolation of 511 pixels to 1728 pixels, bicubic horizontal interpolation of interpolated pixel N uses adjacent input pixels P−1, P, P+1 and P+2, where P=INT[N(511)/1727)], and INT(X/Y)=integer value of the quotient X/Y. Thus, in the case of the 1000th pixel, i.e. N=1000, pixel 294 (INT[1000(511)/1727)]−1=294), pixel 295 (INT[1000(511)/1727)]=295), pixel 296 (INT[1000(511)/1727)]+1=296) and pixel 297 (INT[1000(511)/1727)]+2=297) are used.

The bicubic interpolation coefficients are stored in the data memory 154 for access and use by the DSP 150 as needed. An exemplary table of bicubic interpolation coefficients for the present invention are listed below in Table 3. In accordance with the discussion above for the example of N=1000, entry #7 from Table 3 would be used, i.e. the four coefficients −0.0072528, 0.100095, 0.978025 and −0.070867 (selected as shown above).

TABLE 3

| BICUBIC INTERPOLATION COEFFICIENTS | | | | |
|---|---|---|---|---|
| Entry | $C_A$ | $C_B$ | $C_C$ | $C_D$ |
| 0 | 0.0 | 0.0 | 1.0 | 0.0 |
| 1 | −0.000150545 | 0.0125718 | 0.999548 | −0.0119695 |
| 2 | −0.000601546 | 0.0257377 | 0.998194 | −0.0233 |
| 3 | −0.0013511 | 0.0394882 | 0.995939 | −0.0340764 |
| 4 | −0.00239604 | 0.0538123 | 0.992789 | −0.0442049 |
| 5 | −0.00373195 | 0.0686975 | 0.988748 | −0.0537132 |
| 6 | −0.00535317 | 0.0841302 | 0.983823 | −0.0626003 |
| 7 | −0.0072528 | 0.100095 | 0.978025 | −0.070867 |
| 8 | −0.00942276 | 0.116575 | 0.971363 | −0.078515 |
| 9 | −0.0118537 | 0.133553 | 0.963848 | −0.0855479 |
| 10 | −0.0145353 | 0.15101 | 0.955496 | −0.0919704 |
|  | −0.0174559 | 0.168924 | 0.94632 | −0.0977885 |
|  | −0.0206028 | 0.187275 | 0.936338 | −0.10301 |
|  | −0.0239622 | 0.206039 | 0.925566 | −0.107643 |
|  | −0.0275194 | 0.225192 | 0.914025 | −0.111698 |
| 15 | −0.0312586 | 0.24471 | 0.901734 | −0.115185 |
|  | −0.0351631 | 0.264565 | 0.888716 | −0.118118 |
|  | −0.0392151 | 0.284731 | 0.874995 | −0.12051 |
|  | −0.0433963 | 0.305179 | 0.860593 | −0.122376 |
|  | −0.0476873 | 0.325881 | 0.845537 | −0.12373 |
| 20 | −0.0520681 | 0.346806 | 0.829853 | −0.124591 |
|  | −0.0565178 | 0.367923 | 0.813569 | −0.124975 |
|  | −0.0610151 | 0.389202 | 0.796713 | −0.124901 |
|  | −0.065538 | 0.41061 | 0.779316 | −0.124388 |
|  | −0.0700639 | 0.432114 | 0.761406 | −0.123456 |
| 25 | −0.0745699 | 0.453682 | 0.743015 | −0.122127 |
|  | −0.0790326 | 0.475278 | 0.724175 | −0.120421 |
|  | −0.0834282 | 0.496871 | 0.704918 | −0.118361 |
|  | −0.0877326 | 0.518424 | 0.685278 | −0.115969 |
|  | −0.0919218 | 0.539904 | 0.665287 | −0.113269 |
| 30 | −0.0959713 | 0.561275 | 0.64498 | −0.110284 |
|  | −0.0998566 | 0.582503 | 0.62439 | −0.107037 |
|  | −0.103553 | 0.603553 | 0.603553 | −0.103553 |
|  | −0.107037 | 0.62439 | 0.582503 | −0.0998566 |
|  | −0.110284 | 0.64498 | 0.561275 | −0.0959713 |
| 35 | −0.113269 | 0.665287 | 0.539904 | −0.0919218 |
|  | −0.115969 | 0.685278 | 0.518424 | −0.0877326 |
|  | −0.118361 | 0.704918 | 0.496871 | −0.0834282 |
|  | −0.120421 | 0.724175 | 0.475278 | −0.0790326 |
| 39 | −0.122127 | 0.743015 | 0.453682 | −0.0745699 |
| 40 | −0.123456 | 0.761406 | 0.432114 | −0.0700639 |
| 41 | −0.124388 | 0.779316 | 0.41061 | −0.065538 |
|  | −0.124901 | 0.796713 | 0.389202 | −0.0610151 |
|  | −0.124975 | 0.813569 | 0.367923 | −0.0565178 |
|  | −0.124591 | 0.829853 | 0.346806 | −0.0520681 |
| 45 | −0.12373 | 0.845537 | 0.325881 | −0.0476873 |

TABLE 3-continued

| | BICUBIC INTERPOLATION COEFFICIENTS | | | |
|---|---|---|---|---|
| Entry | $C_A$ | $C_B$ | $C_C$ | $C_D$ |
| | −0.122376 | 0.860593 | 0.305179 | −0.0433963 |
| | −0.12051 | 0.874995 | 0.284731 | −0.0392151 |
| | −0.118118 | 0.888716 | 0.264565 | −0.0351631 |
| | −0.115185 | 0.901734 | 0.24471 | −0.0312586 |
| 50 | −0.111698 | 0.914025 | 0.225192 | −0.0275194 |
| | −0.107643 | 0.925566 | 0.206039 | −0.0239622 |
| | −0.10301 | 0.936338 | 0.187275 | −0.0206028 |
| | −0.0977885 | 0.94632 | 0.168924 | −0.0174559 |
| | −0.0919704 | 0.955496 | 0.15101 | −0.0145353 |
| 55 | −0.0855479 | 0.963848 | 0.133553 | −0.0118537 |
| | −0.078515 | 0.971363 | 0.116575 | −0.00942276 |
| | −0.070867 | 0.978025 | 0.100095 | −0.0072528 |
| | −0.0626003 | 0.983823 | 0.0841302 | −0.00535317 |
| | −0.0537132 | 0.988748 | 0.0686975 | −0.00373195 |
| 60 | −0.0442049 | 0.992789 | 0.0538123 | −0.00239604 |
| | −0.0340764 | 0.995939 | 0.0394882 | −0.0013511 |
| | −0.02333 | 0.998194 | 0.0257377 | −0.000601546 |
| 63 | −0.0119695 | 0.999548 | 0.0125718 | −0.000150545 |

Figure 3C:
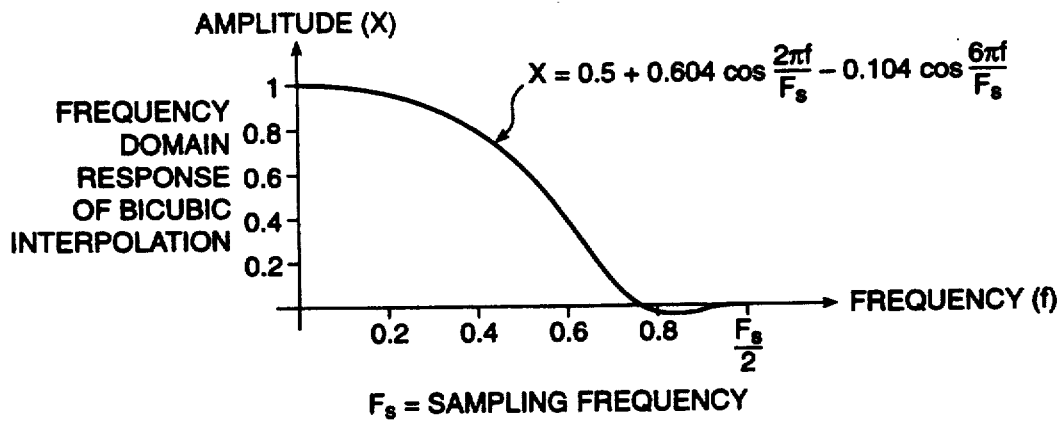
FIG. 3C illustrates the frequency domain response of an exemplary bicubic interpolation operation for the video-to-facsimile signal converter of FIG. 2A.

Referring to FIG. 3C, the filtering effect of the bicubic interpolation in the frequency domain is shown. The amplitude versus frequency function is similar to that of a low-pass filter. During bicubic interpolation, the product of this function and the function representing the frequency response of the incoming pixel data provides the output, i.e. interpolated, pixel data.

Figure 3D:
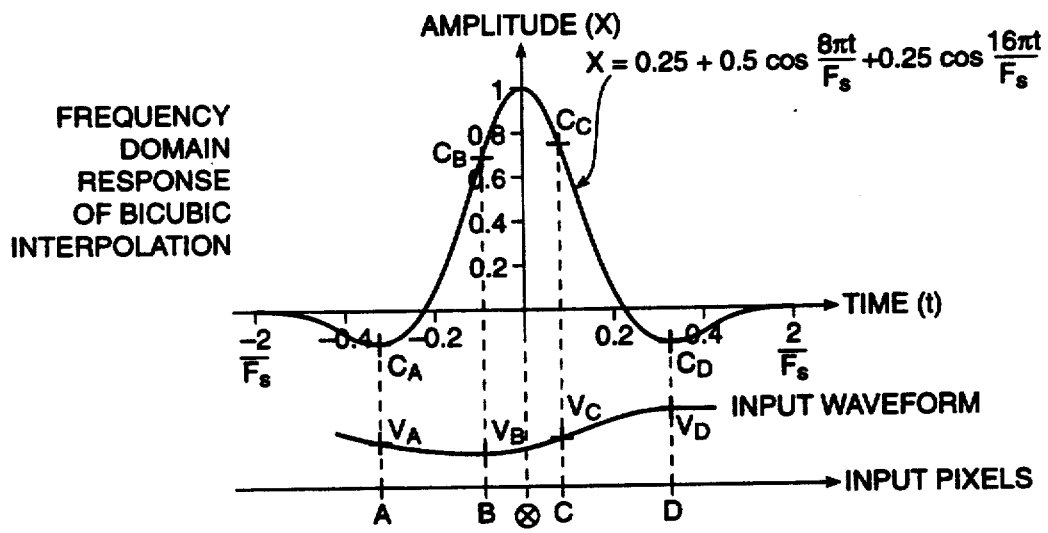
FIG. 3D illustrates the time domain response of an exemplary bicubic interpolation operation for the video-to-facsimile signal converter of FIG. 2A.

Referring to FIG. 3D, the filtering effect of the bicubic interpolation in the time domain is shown. Also shown are the graphical relationships between the input pixels and the corresponding interpolation coefficients' values. Here in FIG. 3D, input pixels A, B, C, and D would correspond to pixels 294, 295, 296 and 297, respectively, as discussed in the example above. During bicubic interpolation, the convolution of this function and the incoming pixel data provides the output, i.e. interpolated, pixel data ($C_A V_A + C_B V_B + C_C V_C + C_D V_D$).

The image processing 210 performed can be of several various types, such as video data inversion, contour mapping or contrast manipulation. Video data inversion would provide for a "negative" image. Contour mapping would involve the application of multiple thresholds to the video data for providing an image with more of a stepped gray-scale, or for allowing the detection of changes in a scene being monitored using simple comparison techniques. One form of contrast manipulation can involve the changing of the video data contrast transfer function to expose image details otherwise hidden in shadows or a dark scene.

In a preferred embodiment of the present invention, the image processing 210 performed is image enhancement, which is done in two dimensions. As seen in FIG. 4A, the one-dimensional frequency response of the image enhancement is amplification of data signal amplitudes at the frequencies closely adjacent to half of the sampling frequency ($F_S/2$) of the ADC 114. As seen in FIG. 4B, a two-dimensional filter is used where, in both the horizontal and vertical filtering, the current input pixel data undergoing enhancement is multiplied by a coefficient of 2.0 and the immediately adjacent horizontal and vertical pixels' data are each multiplied by a coefficient of −0.25. The sum of these products provides the image-enhanced pixel data.

Referring to FIG. 4C, the effect of the image enhancement can be seen in the time domain. The edges of an image are sharpened in the sense that data amplitude transitions are rendered more steep, i.e. faster. The effect in the frequency domain, as shown in FIG. 4D, is to increase the frequency at which the response begins to roll of, i.e. increase the effective low-pass filter bandwidth as compared to that of interpolation only (discussed above).

Figure 5A:
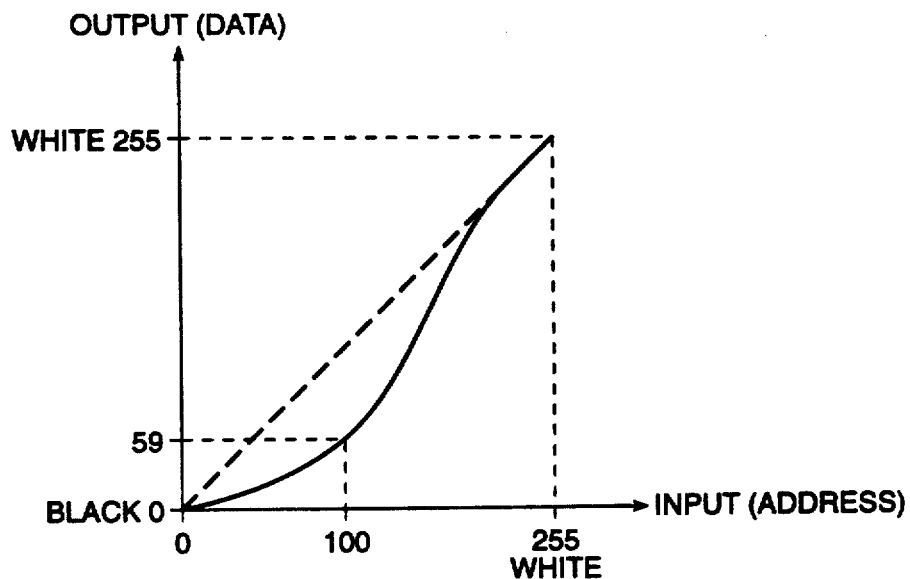
FIG. 5A illustrates an exemplary contrast alteration curve representing the transfer function of the contrast alteration operation of the video-to-facsimile signal converter of FIG. 2A.

Referring to FIG. 5A, an exemplary output versus input transfer function is illustrated graphically for the contrast alteration, or dot gain correction, process performed by the DSP 150, program memory 152 and data memory 154, as discussed above (FIG. 2A). As seen in FIG. 5A, the transfer function, normally a linear output versus input relationship, is selectively altered to cause input pixel information having medium gray-scale values to be darkened. This type of altered transfer function can be computed or derived semi-empirically to give the best results with a gray-scale ramp input as the test image. Further, this type of altered transfer function represents the inverse of the typical nonlinear characteristics of a typical facsimile printing mechanism, thereby providing a form of precompensation for the video image data to be printed thereby.

Figure 5B:
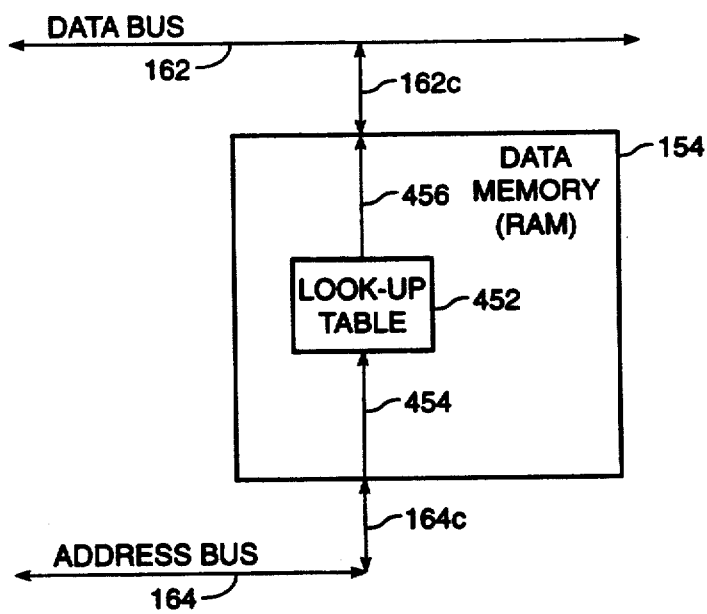
FIG. 5B is a functional block diagram of an exemplary contrast alteration means for the video-to-facsimile signal converter of FIG. 2A.

Referring to FIG. 5B, a preferred implementation of the aforementioned contrast alteration process includes a look-up table 452 which is constructed within a portion of the data memory 154. The interpolated pixel data 454 is received via the address bus 164 and address bus interface 164c and serves as the input address(es) for the look-up table 452. The accessed data 456 has values which are in accordance with the desired transfer function, as discussed above (FIG. 5A). This data 456 is conveyed via the data bus interface 162c to the data bus 162 for transfer to the DSP 150 and conversion by the pixel-to-pel converter 206 as discussed above (FIG. 2A).

It should be understood that, since the look-up table 452 uses only a portion of the data memory 154 and that portion need not necessarily begin at address location "zero," the input addresses, i.e. the interpolated pixel data 454, can include an address offset. The address offset would increment the address values appropriately to access that portion of the data memory 154 constituting the look-up table 452. The address offset can be generated and added to the interpolated pixel data 454 by the DSP 150, with the result placed onto the address bus 164.

As initially discussed above, the pixel-to-pel converter 206 receives and converts pixel data to pel data. This process, often referred to as "dithering," can be performed in accordance with a number of techniques. Three techniques, as discussed below and represented in Matrices 1-3 below, involve using a: 45° Classical Screen (Matrix 1); Line Screen (Matrix 2); or Spiral-Dot Screen (Matrix 3). A more detailed discussion regarding these techniques can be found in R. Ulichney, "Digital Halftoning," pp. 77-126, MIT Press 1987 (incorporated herein by reference).

Referring to Matrix 1 below, the 45° Classical Screen mimics the 50-100 lines per inch screen traditionally used in printing a continuous tone image in newspapers or magazines. The triangularly-shaped numerical arrays are replicated over the entire image, thereby giving a superimposed screen which alternates from light to dark, 50-100 times per inch. The number within the numerical arrays are threshold values to which the 8-bit pixel's gray-scale value are compared one at a time to resolve 19 (Matrix 1(a)) or 33 (Matrix 1(b)) gray levels.

The incoming pixel data is compared with the corresponding threshold value within the superimposed threshold numerical array, and if the pixel value is less than the threshold value, a black dot is printed. Conversely, if the pixel value is greater than the threshold value, no black dot is printed. In this way, each pixel (8-bit) is converted to a pel (1-bit) which the receiving facsimile machine 110 (FIG. 1) can print out either as a black dot, or as the absence of a black dot. The resulting image, now seen through the superimposed Classical Screen, consists of pels, i.e. 1-bit pixels.

MATRIX 1:
Threshold Arrays for 45° Classical Screens
(a) M = 3 (19 levels of gray with 8-bit pixel values over range of 0-255)

```
                  | 134 |
               27 | 175 243 |
            54 40 | 187 202 216 |
    134 162 148 121 |  94 108 | 134
        243 229  81 |  13  27 |
            216  67 |  54     |
                  | 134 |
```

(b) M = 4 (33 levels of gray with 8-bit pixel values over range of 0-255)

```
                       | 147 |
                    78 | 217 225 |
                 16 85 | 209 248 240 |
              54 62 116| 186 202 194 140|
    147 163 155 132 | 109  93 101 124 | 147
        225 233 178 |  39  31  23  78 |
          . 240 171 |  47   8  16    |
                140 |  70  54        |
                       | 147 |
```

Referring below to Matrix 2, the Line Screen operates similarly to the Classical Screen, except that the superimposed screen is at 0°, rather than 45°. This will produce a final image which is more coarse, but will reduce the transmission time since the facsimile standard encoding (discussed further below) operates along lines. The Line Screen tends to concentrate dots along lines, whereas the Classical Screen concentrates them in a 45° orientation.

MATRIX 2:
Threshold Array for Line Screen
(37 levels of gray with 8-bit pixel values over range of 0-255)

```
     249 235 221 214 228 242 249
     166 152 138 131 145 159 166
      83  69  55  48  62  76  83
...   42  28  14   7  21  35  42 ...
     125 111  97  90 104 118 125
     208 194 180 173 187 201 208
     249 235 221 214 228 242 249
```

Referring below to Matrix 3, the Spiral-Dot Screen operates in accordance with the foregoing discussion, with the superimposed screen oriented at 45°. This screen tends to create circular regions of varying intensity, similar to a picture oriented in a typical newspaper.

MATRIX 3:
Threshold Array for Spiral-Dot Screen
(26 levels of gray with 8-bit pixel values over range of 0-255)

```
     207 217 226 236 246 207
     197 | 69  79  89  98 | 197
...  187 | 59  10  20 108 | 187 ...
     177 | 49  39  30 118 | 177
     167 158 148 138 128 167
     207 217 226 236 246 207
```

The foregoing screen approaches in accordance with Matrices 1-3 compare each unmodified pixel within the image with a threshold value which varies depending upon the current pixel's position within the video image. Referring below to Matrix 4, a preferred embodiment of the present invention uses a technique in which error diffusion is performed in accordance with the Floyd-Steinberg error propagation theory. Floyd-Steinberg error diffusion differs from the foregoing screen approaches in that while each pixel is compared to a fixed threshold, the pixel value being compared consists of its original value plus an error value propagated from surrounding pixels. When the current pixel value is greater than the threshold, the error value is equal to 255 subtracted from the current pixel value. If the current pixel value is less than the threshold, the error value is zero.

MATRIX 4: Error Filter Values $$\left(\frac{1}{16} x\right) \quad \begin{array}{ccc} \cdot & 7 \\ 3 & 5 & 1 \end{array}$$

Floyd and Steinberg (1975)
(rectangular grid)
("·" represents the current pixel)

Figure 6:
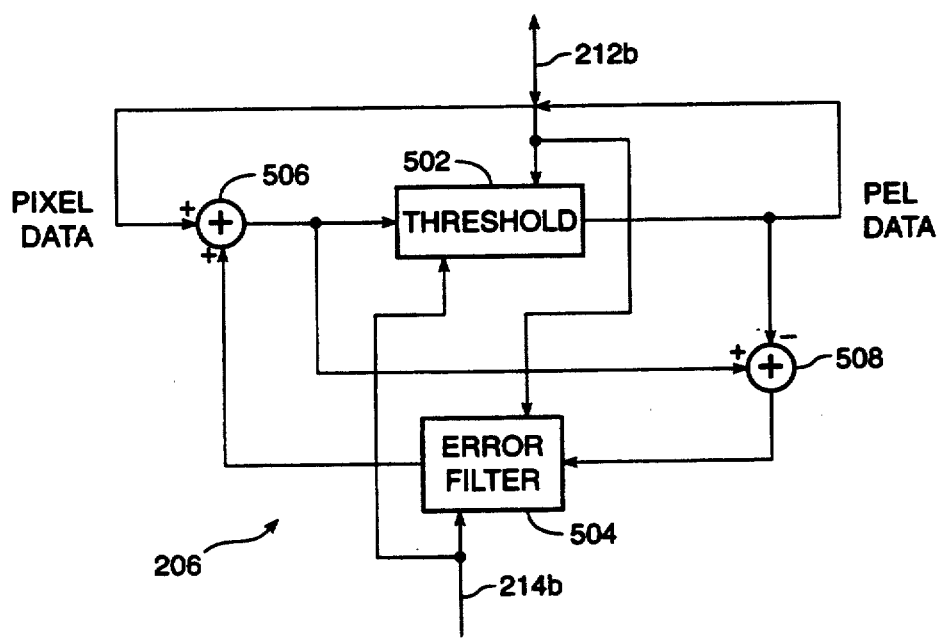
FIG. 6 is a functional block diagram of the operation of an error diffusion algorithm used for a pixel-to-pel data conversion operation for the video-to-facsimile signal converter of FIG. 2A.

Referring to FIG. 6, the pixel-to-pel converter 206 performs pixel-to-pel conversion in accordance with the Floyd-Steinberg theory, which can be visualized as shown. The pixel data (interpolated, contrast-altered and selectively image-enhanced), received from the data memory 154 (FIG. 2A) via the data bus interface 212b, is converted to pel data using a threshold 502, error filter 504, input adder 506 and output adder 508. As seen above in Matrix 4, to propagate the pixel error in accordance with the Floyd-Steinberg theory, 7/16ths of the error value is added to the next pixel on the same line, 3/16ths of the error value is added to the pixel on the line below and one pixel position to the left, 5/16ths of the error value is added to the pixel directly below, and 1/16th of the error value is added to the pixel below and to the right, as shown. The effect of the Floyd-Steinberg error diffusion is to approximate a gray-scale value, or tone, within a region by producing the approximate number of black dots which correspond to the gray-scale value of the original image, with the dots spread as randomly as possible so that no particular structure is visible.

As initially discussed above, the facsimile standard encoding of the pel data is in accordance with the CCITT Group 3 (Recommendation T.4) facsimile standard. In a preferred embodiment of the present invention, the facsimile standard encoder 208 (FIG. 2A) also performs one-dimensional modified Huffman encoding upon the pel data. One-dimensional modified Huffman encoding is advantageous in that small numbers of binary digits can be used to represent long runs of black or white pels.

Each line of data is composed of a series of variable length code words, each of which represents a run length of either all white or all black picture elements. The white and black runs alternate, and a total of 1728 picture elements represent one typical horizontal scan line of 215 mm length. To maintain synchronization, all data lines begin with a white run length code word. However, if the actual scan line begins with a black run, a white run length of zero will be sent. The black or white run lengths, up to a maximum of one scan line (1728 picture elements or "pels") are defined by the code words in Tables 4 and 5 below.

The code words are of two types: (1) Terminating Codes; and (2) Make-Up Codes. Each run length is represented by either a Terminating Code word, or a Make-Up Code word followed by a Terminating Code word. Run lengths in the range of 0–63 pels are encoded with their appropriate Terminating Code word from Table 4. As shown in Table 4, there are different code words for black and white run lengths.

TABLE 4

| White run length | Terminating Codes Code Word | Black run length | Code Word |
|---|---|---|---|
| 0 | 00110101 | 0 | 0000110111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |
| 6 | 1110 | 6 | 0010 |
| 7 | 1111 | 7 | 00011 |
| 8 | 10011 | 8 | 000101 |
| 9 | 10100 | 9 | 000100 |
| 10 | 00111 | 10 | 0000100 |
| 11 | 01000 | 11 | 0000101 |
| 12 | 001000 | 12 | 0000111 |
| 13 | 000011 | 13 | 00000100 |
| 14 | 110100 | 14 | 00000111 |
| 15 | 110101 | 15 | 000011000 |
| 16 | 101010 | 16 | 0000010111 |
| 17 | 101011 | 17 | 0000011000 |
| 18 | 0100111 | 18 | 0000001000 |
| 19 | 0001100 | 19 | 00001100111 |
| 20 | 0001000 | 20 | 00001101000 |
| 21 | 0010111 | 21 | 00001101100 |
| 22 | 0000011 | 22 | 00000110111 |
| 23 | 0000100 | 23 | 00000101000 |
| 24 | 0101000 | 24 | 00000010111 |
| 25 | 0101011 | 25 | 00000011000 |
| 26 | 0010011 | 26 | 000011001010 |
| 27 | 0100100 | 27 | 000011001011 |
| 28 | 0011000 | 28 | 000011001100 |
| 29 | 00000010 | 29 | 000011001101 |
| 30 | 00000011 | 30 | 000001101000 |
| 31 | 00011010 | 31 | 000001101001 |
| 32 | 00011011 | 32 | 000001101010 |
| 33 | 00010010 | 33 | 000001101011 |
| 34 | 00010011 | 34 | 000011010010 |
| 35 | 00010100 | 35 | 000011010011 |
| 36 | 00010101 | 36 | 000011010100 |

TABLE 4-continued

| White run length | Terminating Codes Code Word | Black run length | Code Word |
|---|---|---|---|
| 37 | 00010110 | 37 | 000011010101 |
| 38 | 00010111 | 38 | 000011010110 |
| 39 | 00101000 | 39 | 000011010111 |
| 40 | 00101001 | 40 | 000001101100 |
| 41 | 00101010 | 41 | 000001101101 |
| 42 | 00101011 | 42 | 000011011010 |
| 43 | 00101100 | 43 | 000011011011 |
| 44 | 00101101 | 44 | 000001010100 |
| 45 | 00000100 | 45 | 000001010101 |
| 46 | 00000101 | 46 | 000001010110 |
| 47 | 00001010 | 47 | 000001010111 |
| 48 | 00001011 | 48 | 000001100100 |
| 49 | 01010010 | 49 | 000001100101 |
| 50 | 01010011 | 50 | 000001010010 |
| 51 | 01010100 | 51 | 000001010011 |
| 52 | 01010101 | 52 | 000000100100 |
| 53 | 00100100 | 53 | 000000110111 |
| 54 | 00100101 | 54 | 000000111000 |
| 55 | 01011000 | 55 | 000000100111 |
| 56 | 01011001 | 56 | 000000101000 |
| 57 | 01011010 | 57 | 000001011000 |
| 58 | 01011011 | 58 | 000001011001 |
| 59 | 01001010 | 59 | 000000101011 |
| 60 | 01001011 | 60 | 000000101100 |
| 61 | 00110010 | 61 | 000001011010 |
| 62 | 00110011 | 62 | 000001100110 |
| 63 | 00110100 | 63 | 000001100111 |

Run lengths in the range of 64–1728 pels are encoded first by the Make-Up Code word from Table 5 representing the run length which is equal to or shorter than that required, followed by the Terminating Code word from Table 4 representing the difference between the required run length and the run length represented by that Make-Up Code.

TABLE 5

| White run length | Make-Up Codes Code Word | Black run length | Code Word |
|---|---|---|---|
| 64 | 11011 | 64 | 0000001111 |
| 128 | 10010 | 128 | 000011001000 |
| 192 | 010111 | 192 | 000011001001 |
| 256 | 0110111 | 256 | 000001011011 |
| 320 | 00110110 | 320 | 000000110011 |
| 384 | 00110111 | 384 | 000000110100 |
| 448 | 01100100 | 448 | 000000110101 |
| 512 | 01100101 | 512 | 0000001101100 |
| 576 | 01101000 | 576 | 0000001101101 |
| 640 | 01100111 | 640 | 0000001001010 |
| 704 | 011001100 | 704 | 0000001001011 |
| 768 | 011001101 | 768 | 0000001001100 |
| 832 | 011010010 | 832 | 0000001001101 |
| 896 | 011010011 | 896 | 0000001110010 |
| 960 | 011010100 | 960 | 0000001110011 |
| 1024 | 011010101 | 1024 | 0000001110100 |
| 1088 | 011010110 | 1088 | 0000001110101 |
| 1152 | 011010111 | 1152 | 0000001110110 |
| 1216 | 011011000 | 1216 | 0000001110111 |
| 1280 | 011011001 | 1280 | 0000001010010 |
| 1344 | 011011010 | 1344 | 0000001010011 |
| 1408 | 011011011 | 1408 | 0000001010100 |
| 1472 | 010011000 | 1472 | 0000001010101 |
| 1536 | 010011001 | 1536 | 0000001011010 |
| 1600 | 010011010 | 1600 | 0000001011011 |
| 1664 | 011000 | 1664 | 0000001100100 |
| 1728 | 010011011 | 1728 | 0000001100101 |
| EOL | 000000000001 | EOL | 000000000001 |

Run lengths greater than 1728 pels are encoded first by the Make-Up Code word from Table 6 representing the run length which is equal to or shorter than that required, followed by the Terminating Code word from Table 4 representing the difference between the required run length and the run length represented by that Make-Up Code.

TABLE 6
Make-Up Codes
Note: For machines which accommodate larger paper widths while maintaining the standard horizontal resolution the following Make-Up Code set is provided:

| Run length (black and white) | Make-Up Codes |
|---|---|
| 1792 | 00000001000 |
| 1856 | 00000001100 |
| 1920 | 00000001101 |
| 1984 | 000000010010 |
| 2048 | 000000010011 |
| 2112 | 000000010100 |
| 2176 | 000000010101 |
| 2240 | 000000010110 |
| 2304 | 000000010111 |
| 2368 | 000000011100 |
| 2432 | 000000011101 |
| 2496 | 000000011110 |
| 2560 | 000000011111 |

As discussed above, the program memory 152 (FIG. 1) provides the instructions for the DSP 150 to carry out its data processing functions (FIGS. 2A and 2B). An exemplary listing of the software for providing those instructions in accordance with the foregoing discussion and figures is included below in Appendix A preceding the claims.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

APPENDIX A

```
ASSEMBLY CODE FOR CORE PROCESSING FOR VIDEO TO FAX CONVERSION.
(Using the ADSP2105 DSP chip).

Operation;

External hardware captures 4 lines (4x512) or 4 columns (4x480) of pixels,
depending on whether rotation is disabled, or enabled.  The data is
stored in a static 2kx8 FIFO.  If rotation is enabled, the data needs
to be deinterleaved from its 4-byte vertical grouping; this is done
as data is transferred from the SFIFO to SRAM.

The 4 lines of data are interpolated from 480 to 1728 (or 1576);
whenever a new line is required, it is read from the SFIFO into the
circular 4x480 (or 4x512) buffer addressed by i7.  For simplicity,
4 new lines are grabbed after each transfer into SRAM.  (Note; sometimes,
several lines are read from the SFIFO, as at the start of a frame or
when decimation is required for A6 size).

The 4 interpolated lines are held in the circular buffer addressed by i5.
These are accessed to create the final interpolated fax width and length
resolution lines, which are stored in a 2x1728 (or 1576) circular buffer
addressed by i1.  This buffer is only required for Floyd-Steinberg error
diffusion.

Optional image enhancement (under user control can then be performed).
This consists of a 2-D filter with a high-frequency boost to
enhance edges.

The pixels are then contrast-adjusted, using a look-up table, to
compensate for nonlinearities in the fax machine at the receiving
end.

Each interpolated fax resolution pixel is dithered, either by line or
classical screen (simple comparison) or with Floyd-Steinberg error
diffusion, at which point the white/black runlength is incremented./
If the color toggles at the current pixel, the runlength up to the
current pixel is encoded using Huffman 1-D encoding.  If the
number of new code bits plus the code bits left over from the last
encoding operation is 16 or more, the 16 most-significant are moved
to the huffman-encoded output buffer, where they can be picked up
whenever there is a modem interrupt.

Index registers;
   i0      width interpolation coeffs, 128 entries, stored in ext RAM or
           length interpolation coeffs, 128 entries, stored in ext RAM
   i1      2 interpolated lines, for error diffusion (2x1728 or 2x1576),
           always operate on the old half, and propagate onto the new half
   i2      Floyd-Steinberg or screen coeffs, 4 or more, stored internally
``` i3    dot gain correction, 256 entries, stored in ext RAM
i4    bit count for Huffman encoding, also ext RAM huffman code table (364 words, 128 each for white and black, 54 each for white and black makeup)
i5    current fax output line (i.e fax resolutions), 4x1728 or 4x1576
i6    huffman encoded output buffer, several kwords
i7    current video input line (i.e video resolutions), 4x480 or 4x512

Modify values for index registers;
m0    0
m1    1
m2    -1
m3    128/3 = 32 (required for interpolation coeffs)
m4    1728 (or whatever line to line offset is)
m5    -1728
m6    480 (or 512 depending on rotation on or off)
m7    -480 (or -512)

Length values for index registers;
l0    1k (? length of buffer for fax output)
l1    4x480 or 4x512, for video input data
l2    4x1728 or 4x1576, for intermediate fax width resolution lines
l3    2x1728 or 2x1576, for Floyd-Steinberg error diffusion buffer cntr  1728 or 1576 (the number of pixels to be interpolated to). cntr decrements, and is used to index lines or columns of pixels, so that the first pixel is at an address offset into SRAM of 1728, rather than at 0. cntr is used both during transfer from static FIFO to SRAM, and during interpolation.

{
/********************************************************
                    INTERPOLATION

Bicubic interpolation, with the data stored externally in SRAM, the width interpolation coefficients stored internally in program RAM, and the length interpolation coefficients transferred from external RAM or EPROM to internal program RAM at the start of each new fax output line (this means both coefficient and data loading during each MAC instruction, since the PMD and the DMD busses are used).

Data and coefficients are in 1.15 format, of which only the 8 msb are significant (the lower 8 are zeroed at power on and are generally ignored).

2-pass, with interpolation in the width direction, then in the length direction, is more efficient (requires fewer instructions) than 1-pass, which is a 4x4 kernel at each output pixel. However, it does require storage of 4 fax-width lines.

Calling parameters;
        cntr            current fax width pixel number
        phase_w         fax width phase increment
Return parameters;

********************************************************
Fax width interpolation;
This loop may be required more than once if decimating, or at the start of a field. It converts the input line (at 480 or 512) to fax_w (1728 or 1576), using cubic interpolation. The interpolated lines are stored in the circular buffer addressed by i5, which is 4 lines (4x1728 or 1576) long. Take data from buffer i7, and store it in buffer i5.
********************************************************
} cntr=dm(fax_w);         fax_w=1728 or 1576
        i5=dm(interp_prev);     i5=previous pointer to buffer
                                (i.e. will add new line after last new line)
        ay0=dm(input_prev);     ay=prev pointer to input i7 buffer do width until ce;      loop for fax width

```
            mx0=cntr;                cntr=current output pixel number
            my0=phase_w;             phase_w=phase increment, from RAM
            mr=mx0*my0;              current output pix location
            ar=mr1+ay0-1;            mr1=integer part = nearest input pixel
                                     on the left-hand side of current output posn
            i7=ar;                   i7 points to the first interp pixel
            ay0=w_interp_st+31;      ax=address of 31th entry in coeff table
                                     (the right-most posn of the first coeff to be
                                     used)
            sr0=mr0 lshift by -11;   shift fract part of output pix location from
                                     16 bits to 5 bits (value is 0 to 31, which
                                     equals 128/4)
            ar=ay0-sr0;              ar=address of interp coeff for first pixel
                                     (i.e. 0 to 31th entry in coeff table)
            i0=ar;                   i0 points to first interp coeff (in internal
                                     program RAM)

mr=0,mx0=dm(i7,m1),my0=pm(i0,m1); mx=first pixel, my=first coeff
            cntr=3;
            do w_int until ce;       loop 4 times
  w_int:    mr=mr+mx0*my0,mx0=dm(i7,m1),my0=pm(i0,m1);   multiply-accumulate i:
                                                        width direction
            if mv sat mr;            saturate if necessary width:    dm(i5,m1)=mr1;           store interpolated value in i5 dm(interp_prev)=i5;      store pointer to i5 for next time around
            dm(input_prev)=i7;       store pointer to i7 for next time around }
************************************************************
Fax length interpolation
This loop is required once per fax line out.  It converts from 4 lines
(stored in buffer i5) of width fax_w, to one line (stored in buffer i1)
of width fax_w. The loop is fax_w long (i.e. do entire line of fax
resolution width at the one time).  Before storing interpolated back
into i1 buffer, use the dot gain lookup table (i3) to give the
correct gray-scale image.
************************************************************
}
            cntr=dm(fax_w);          fax_w=1728 or 1576
            i1=dm(interp_prev);      i1=previous pointer to buffer
            i5=dm(i5_start_adr);     i5=beg of 4x1728 intermediate buffer
            ay0=dm(len_coef_start_adr); ay0=start of length coeffs mx0=cntr;                cntr=current output pixel number
            my0=phase_l;             phase_l=phase increment, from RAM
            mr=mx0*my0;              current output pix location
            af=ay0+31;               ar=address of 31th entry in coeff table
                                     (the right-most posn of the first coeff to be
                                     used)
            sr0=mr0 lshift by -11;   shift fract part of output pix location from
                                     16 bits to 5 bits (value is 0 to 31, which
                                     equals 128/4)
            ar=af-sr0;               ar=address of interp coeff to first pixel
                                     (i.e. 0 to 31th entry in coeff table)
            i0=ar;                   i0 points to first interp coeff (in internal
                                     program RAM)

ar=dm(i0,m3);            move the 4 length coeffs into int prog RAM
            pm(l_coeff0)=ar;
            ar=dm(i0,m3);
            pm(l_coeff1)=ar;
            ar=dm(i0,m3);
            pm(l_coeff2)=ar;
            ar=dm(i0,m0);
            pm(l_coeff3)=ar;

do width until ce;       loop for fax width
            mr=0,mx0=dm(i5,m4),my0=pm(c0); mx=first pixel, my=first coeff
            mr=mr+mx0*my0,mx0=dm(i5,m4),my0=pm(c1); multiply-accumulate in
            mr=mr+mx0*my0,mx0=dm(i5,m4),my0=pm(c2); width direction
            mr=mr+mx0*my0,mx0=dm(i5,m5),my0=pm(c3);
```

```
        modify(i5,m5);        bring i5 back to 1st line in i5
        modify(i5,m5);
        modify(i5,m1);        step i5 to the next pixel on the 1st line if mv sat mr;         saturate if necessary
{
*********************************************************
            IMAGE ENHANCEMENT Similar to interpolation, except 2-D kernal, with amount
of enhancement possibly under user control.  Not written yet.
*********************************************************

*********************************************************
        DOT GAIN CORRECTION (CONTRAST ADJUSTMENT)
*********************************************************
}
        ay0=dm(dot_gain_start); ay0= start of dot gain lookup table in ext RA
        sr0=mr1 lshift by -8;  shift right by 8 because use only 8 bits
        ar=sr0+ay0;            compute address for lookup table
        i3=ar;                 store in index register
        mr1=dm(i3,m0);         get corrected value width:  dm(i1,m1)=mr1;         store interpolated value in i1 dm(interp_prev)=i1;    store pointer to i1 for next time around

{

*********************************************************
                    DITHERING

Compare to a threshold; if > threshold, then pixel is white, if <
threshold, pixel is black.
Note;   data is in 1.15 format, so when a pixel exceeds the FS
        threshold, 255 is subtracted from it (actually 255*256).
        Using 1.15 format allows saturation logic to work properly.

Calling parameters;
        prev    =-1            if previous bit was black (<thresh)
                =0             if previous bit was white (>thresh)
        i1                     just-calculated interpolated pixel
Return parameters;

Do entire line of fax_w pixels.  Do dithering and encoding.
*********************************************************
}
        i1=dm(fs_prev);        i1=previous pointer to buffer with
                               interpolated, dot-gained pixels
        cntr=dm(fax_w);        iterate fax_w times
        do loop1 until ce;

ay0=dm(thresh);        ay0=threshold
        ax0=dm(prev);          recall prev from int RAM
        abs(ax0);              to get AS status
        if neg jump was_b;
        if pos jump was_w;

was_b:  ax0=dm(i1,m0);         ax0=current pixel from RAM
        ar0=ax0-ay0;           ar0>0 if white, <0 if black
                               (status is latched until below)
        if lt jump still_b;    still black, otherwise white
        ar0=ax0-255*256;       create error value
        if av sat ar;          saturate if necessary
        av=0;                  clear overflow bit
        dm(i1,m0)=ar0;         store in RAM
        dm(prev)=m0;           change prev to 0 (white)
        ax0=182;               offset for black codes = 182
        jump encode;           toggling from black to white still_b:modify (i4,m1);        increment black run count
        jump diffuse;
```

```
was_w:   ax0=dm(i1,m0);                      ax0=current pixel from RAM
         ar0=ax0-ay0;                        ar0>0 if white, <0 if black
                                             (status is latched until below)
         if ge jump still_w;                 still white
         ax0=0;                              offset for white codes = 0
         dm(prev)=m2;                        change prev to -1
         jump encode;                        toggling from white to black still_w: ar0=ax0-255*256;                    create error value
         if av sat ar;                       saturate if necessary;
         av=0;                               clear overflow bit
         dm(i1,m0)=ar0;                      store in RAM
         modify (i4,m1);                     increment white count
         jump diffuse;
{
*********************************************************
                    ENCODING 1-D huffman encoding, with table stored in RAM as 185 2-word entries,
with 1st word = bit count for code word, 2nd word = code.  Calculate the
address into the huffman table as if it were 1-word entries, then
adjust for 2-word entries before adding the table starting address.

Calling parameters;
    ax0                 offset for white/black codes (0 or 182)
    i4                  bit count
    prev                already toggled, so 0 if black, -1
                        if white
    huff_bits_left      code word is left-justified in sr1, with
                        this number of bit posns free to the rhs
    prev_code           bits left over from previous code, left-
                        justified Return parameters;
    fax buffer          new 16-bit encoded value added (if
                        appropriate)

*********************************************************
}
encode:  si=i4;                              check to see if need makeup codes
                                             (i4=run length > 63)
         sr0=lshift si by +6;                logical shift by 6 = divide by 64
         ay0=si;                             ay=run length
         af=pass 0;                          af=0
         ar=sr0+0;                           need sign status
         if gt af=64;                        if sr0>0, need offset to makeup codes
         ax1=63;                             mask for run length
         ar=ax1 AND ay0;                     mask run length < 64
         af=ar+af;                           ar=run length + makeup
         ar=ax0+af;                          ar=run length + makeup + b/w offset
         sr0=lshift ar by -1;                sr0=2xar, because table = 2-word entr
         ay0=dm(huff_start);                 ay=huffman code table start address
         ar=sr0+ay0;                         offset into huffman code table
         i4=ar;                              store huffman pointer in index reg sr1=dm(prev_code);                  sr1=code bits left from prev codeword
         si=dm(i4,m1);                       si=Huffman code word from RAM
         sr=sr or lshift si, ay0=dm(huff_bits_left);  left shift si and
                                                     or with present sr
         ax0=dm(i4,m0);                      read in code word length from RAM
         ar=ay0-ax0;                         new code word length in sr
         if neg jump huff_out;               if pos, still have bits posns spare dm(huff_bits_left)=ar0;             # of bit posns free for next code
         dm(prev_code)=sr1;                  sr1=code bits to save until next word
         jump diffuse;

huff_out: ax0=i6;                            check that not overwriting buffer; ax
                                             pointer for writing buffer
         ay0=fax_buf_out;                    ay=pointer for reading buffer
         ar=ax0-ay0;
         if eq jump fax_buf_error;           if equal, about to overwrite buffer;
                                             jump to error-handling routine
                                             (wait until buffer empties)

dm(i6,m1)=sr1;                      write sr1 to fax output buffer
         ar0=i6+ar0;                         ar0 is -ve, result is spare bit posns
```

```
dm(huff_bits_left)=ar0;      # of bit posns free for next code
dm(prev_code)=sr0;           sr0=code bits to save until next word
jump diffuse;                jump to error diffusion {
*****************************************************
                    ERROR DIFFUSION Floyd Steinberg error diffusion;
                    0       7
          3         5       1
Calling parameters;
     i1=current pixel (value or value-255)
     i2=start of error coeffs
Return parameters;
     i2=start of error coeffs
*****************************************************
} diffuse: mx0=dm(i5,m1);              mx=current error
         my0=dm(i2,m1);              my=error mult (7/16)
         mr=dm(i5,m0);               mr=next pixel, m0=0
         mr=mr+mx0*my0, my0=dm(i2,m1); mr=next pixel+error, my=error mult(3/1
         if mv sat mr;               saturate if necessary
         dm(i5,m4)=mr;               store next pixel in RAM (or use
                                        ax0=mr)

mr=dm(i5,m0);               mr=pixel from next line
         mr=mr+mx0*my0, my0=dm(i2,m1); mr=pixel+error, my=error mult(5/16)
         if mv sat mr;               saturate if necessary
         dm(i5,m1)=mr;               store in RAM mr=dm(i5,m0);               mr=pixel from next line
         mr=mr+mx0*my0, my0=dm(i2,m1); mr=pixel+error, my=error mult(1/16)
         if mv sat mr;               saturate if necessary
         dm(i5,m1)=mr;               store in RAM mr=dm(i5,m0);               mr=pixel from next line
         mr=mr+mx0*my0;              mr=pixel+error;
         if mv sat mr;               saturate if necessary
         dm(i5,m5)=mr;               store in RAM, i5=current pix next time
loop1:   i3=first_fs_compt;          set i3 back to point to the first comp fs_prev=i1;                 store current pointer to RAM for use
                                     next time
```

What is claimed is:

1. A video-to-facsimile signal converter for receiving and converting a video signal representing a continuous tone video image to a facsimile signal for transmission to and reception by a facsimile receiver for simulation of said continuous tone video image, said video-to-facsimile signal converter comprising:

data interpolator means for receiving an interpolation instruction signal and in accordance therewith receiving and interpolating a pixel data signal representing a continuous tone video image, wherein said received pixel data signal includes at least one pixel data block having a plurality of image pixel data with a composite pixel data block gray-scale value which represents a gray-scale value on a contrast transfer function for said continuous tone video image;

data alteration means for receiving and selectively altering said interpolated plurality of image pixel data within said interpolated pixel data signal to selectively alter said contrast transfer function gray-scale value;

pixel-to-pel data converter means for receiving a conversion instruction signal and in accordance therewith receiving and converting said interpolated and selectively altered pixel data signal to a pel data signal, wherein said pel data signal includes at least one pel data block having a composite pel data block gray-scale value, and wherein said composite pixel data block gray-scale value and said composite pel data block gray-scale value are selectively similar;

encoder means for receiving an encoding instruction signal and in accordance therewith receiving and encoding said pel data signal in accordance with a selected facsimile encoding standard to produce a facsimile standard signal; and instruction source means for providing said interpolation, conversion and encoding instruction signals.

2. A video-to-facsimile signal converter as recited in claim 1, wherein said data interpolator means comprises a digital signal processor coupled to said instruction source means for receiving said interpolation instruction signal and in accordance therewith receiving and interpolating said pixel data signal.

3. A video-to-facsimile signal converter as recited in claim 1, wherein said data alteration means comprises a memory look-up table for receiving said interpolated plurality of image pixel data within said interpolated pixel data signal as input addresses therefor and for outputting said interpolated and altered pixel data signal as output data therefrom.

4. A video-to-facsimile signal converter as recited in claim 1, wherein said pixel-to-pel data converter means comprises a digital signal processor coupled to said instruction source means and said data alteration means for receiving said conversion instruction signal and in accordance therewith receiving and converting said interpolated and altered pixel data signal to said pel data signal.

5. A video-to-facsimile signal converter as recited in claim 1, wherein said encoder means comprises a digital signal processor coupled to said instruction source means for receiving said encoding instruction signal and in accordance therewith receiving and encoding said pel data signal in accordance with CCITT Group 3 to produce said facsimile standard signal.

6. A video-to-facsimile signal converter as recited in claim 1, further comprising video signal receiver means for receiving a video signal representing said continuous tone video image and providing said pixel data signal.

7. A video-to-facsimile signal converter as recited in claim 6, further comprising video signal source means for providing said video signal representing said continuous tone video image.

8. A video-to-facsimile signal converter as recited in claim 6, wherein said video signal receiver means comprises an analog-to-digital converter and a video data buffer coupled to said data interpolator means for receiving, digitizing and buffering an analog video signal representing said continuous tone video image, and for providing said pixel data signal.

9. A video-to-facsimile signal converter as recited in claim 1, further comprising signal converter means for receiving and converting said facsimile standard signal to a facsimile transmission signal for transmission to and reception by a facsimile receiver.

10. A video-to-facsimile signal converter as recited in claim 9, wherein said signal converter means comprises a facsimile MODEM coupled to said encoder means for receiving and modulating said facsimile standard signal to provide said facsimile transmission signal for transmission to and reception by a facsimile receiver.

11. A video-to-facsimile signal converter as recited in claim 9, further comprising telephone network interface means for receiving and coupling said facsimile transmission signal into a telephone network for transmission to and reception by a facsimile receiver.

12. A video-to-facsimile signal converter as recited in claim 11, wherein said telephone network interface means comprises a data access arrangement coupled to said signal converter means for receiving and coupling said facsimile transmission signal onto a telephone line.

13. A video-to-facsimile signal converter for receiving and converting a video signal representing a continuous tone video image to a facsimile signal for transmission to and reception by a facsimile receiver for simulation of said continuous tone video image, said video-to-facsimile signal converter comprising:
digital signal processor means for receiving a pixel data signal representing a continuous tone video image, wherein said received pixel data signal includes at least one pixel data block having a plurality of image pixel data with a composite pixel data block gray-scale value which represents a gray-scale value on an original contrast transfer function for said continuous tone video image, and for receiving a plurality of conversion instruction signals and in accordance therewith:
interpolating said plurality of image pixel data,
outputting said interpolated plurality of image pixel data,
receiving a plurality of selectively altered image pixel data which corresponds to said interpolated plurality of image pixel data and has a selectively altered contrast transfer function gray-scale value which is selectively dissimilar to said original contrast transfer function gray-scale value,
dithering said plurality of selectively altered image pixel data to produce a pel data signal including at least one pel data block having a composite pel data block gray-scale value, wherein said composite pixel data block gray-scale value and said composite pel data block gray-scale value are selectively similar, and
encoding said pel data signal in accordance with a selected facsimile encoding standard to produce a facsimile standard signal;
look-up table means for receiving said outputted, interpolated plurality of image pixel data and for providing said plurality of selectively altered image pixel data; and
memory means for providing said plurality of conversion instruction signals.

14. A video-to-facsimile signal converter as recited in claim 13, further comprising video signal receiver means for receiving a video signal representing said continuous tone video image and providing said pixel data signal.

15. A video-to-facsimile signal converter as recited in claim 14, further comprising video signal source means for providing said video signal representing said continuous tone video image.

16. A video-to-facsimile signal converter as recited in claim 14, wherein said video signal receiver means comprise an analog-to-digital converter and a video data buffer coupled to said digital signal processor means for receiving, digitizing and buffering an analog video signal representing said continuous tone video image, and for providing said pixel data signal.

17. A video-to-facsimile signal converter as recited in claim 13, further comprising signal converter means for receiving and converting said facsimile standard signal to a facsimile transmission signal for transmission to and reception by a facsimile receiver.

18. A video-to-facsimile signal converter as recited in claim 17, further comprising telephone network interface means for receiving and coupling said facsimile transmission signal into a telephone network for transmission to and reception by a facsimile receiver.

19. A video-to-facsimile signal converter as recited in claim 18, wherein said telephone network interface means comprises a data access arrangement coupled to said signal converter means for receiving and coupling said facsimile transmission signal onto a telephone line.

20. A video-to-facsimile signal converter as recited in claim 17, wherein said signal converter means comprises a facsimile MODEM coupled to said digital signal processor means for receiving and modulating said facsimile standard signal to provide said facsimile transmission signal for transmission to and reception by a facsimile receiver.

21. A video-to-facsimile signal conversion method for receiving and converting a video signal representing a continuous tone video image to a facsimile signal for transmission to and reception by a facsimile receiver for simulation of said continuous tone video image, said video-to-facsimile signal conversion method comprising the steps of receiving a plurality of conversion instruction signals and in accordance therewith:

receiving a pixel data signal representing a continuous tone video image, wherein said pixel data signal includes at least one pixel data block having a plurality of image pixel data with a composite pixel data block gray-scale value which represents a gray-scale value on a contrast transfer function for said continuous tone video image;

interpolating said pixel data signal;

selectively altering said interpolated plurality of image pixel data within said interpolated pixel data signal to selectively alter said contrast transfer function gray-scale value;

converting said interpolated and selectively altered pixel data signal to a pel data signal, wherein said pel data signal includes at least one pel data block having a composite pel data block gray-scale value, and wherein said composite pixel data block gray-scale value and said composite pel data block gray-scale value are selectively similar; and encoding said pel data signal in accordance with a selected facsimile encoding standard to produce a facsimile standard signal.

22. A video-to-facsimile signal conversion method as recited in claim 21, further comprising the steps of:
receiving an analog video signal representing said continuous tone video image; and
digitizing and buffering said analog video signal to provide said pixel data signal.

23. A video-to-facsimile signal conversion method as recited in claim 21, wherein said step of converting said interpolated and altered pixel data signal to said pel data signal comprises dithering said pixel data signal.

24. A video-to-facsimile signal conversion method as recited in claim 21, further comprising the step of converting said facsimile standard signal to a facsimile transmission signal for transmission to and reception by a facsimile receiver.

25. A video-to-facsimile signal conversion method as recited in claim 24, further comprising the step of coupling said facsimile transmission signal into a telephone network for transmission to and reception by a facsimile receiver.

26. A video-to-facsimile signal conversion method as recited in claim 24, wherein said step of converting said facsimile standard signal to a facsimile transmission signal for transmission to and reception by a facsimile receiver comprises modulating said facsimile standard signal to provide said facsimile transmission signal.

* * * * *